United States Patent
Ferrara et al.

(10) Patent No.: US 10,796,230 B2
(45) Date of Patent: Oct. 6, 2020

(54) CONTENT BASED REMOTE DATA PACKET INTERVENTION

(71) Applicant: Pearson Education, Inc., New York, NY (US)

(72) Inventors: Stephen F. Ferrara, Washington, DC (US); Amy A. Reilly, Dripping Springs, TX (US); Jeffrey T. Steedle, Maitland, FL (US); Amy L. Kinsman, Carpentersville, IL (US); Roger S. Frantz, Austin, TX (US)

(73) Assignee: PEARSON EDUCATION, INC., New York, NY (US)

( * ) Notice: Subject to any disclaimer, the term of this patent is extended or adjusted under 35 U.S.C. 154(b) by 1210 days.

(21) Appl. No.: 15/130,539

(22) Filed: Apr. 15, 2016

(65) Prior Publication Data

US 2017/0300816 A1    Oct. 19, 2017

(51) Int. Cl.
  *G06N 5/02*    (2006.01)
  *G06N 20/00*   (2019.01)
  (Continued)

(52) U.S. Cl.
  CPC .............. *G06N 5/022* (2013.01); *G06F 16/22* (2019.01); *G06N 20/00* (2019.01); *G09B 5/06* (2013.01)

(58) Field of Classification Search
  CPC ........ G06N 5/022; G06N 20/00; G06F 16/22; G09B 5/06
  See application file for complete search history.

(56) References Cited

U.S. PATENT DOCUMENTS

| 2010/0235164 A1 | 9/2010 | Todhunter et al. |
| 2014/0075004 A1 | 3/2014 | Van Dusen et al. |

(Continued)

FOREIGN PATENT DOCUMENTS

| GB | 2446427 A | 8/2008 |
| WO | 2006/068731 A2 | 6/2006 |

OTHER PUBLICATIONS

Mitrovic, Antonija, et al. "ASPIRE: an authoring system and deployment environment for constraint-based tutors." International Journal of Artificial Intelligence in Education 19.2 (2009): 155-188. (Year: 2009).*

(Continued)

*Primary Examiner* — Benjamin P Geib
(74) *Attorney, Agent, or Firm* — Quarles and Brady LLP

(57) ABSTRACT

Systems and methods for remote intervention are disclosed herein. The system can include memory including: a user profile database; a content database; and a model database. The system can include a supervisor device including: a network interface; and an I/O subsystem. The system can include a content management server that can: receive a first electrical signal from the supervisor device; generate and send an electrical signal to the supervisor device directing the launch of the content authoring interface; receive a second electrical signal including content received by the content authoring interface from the supervisor device; identify a plurality of response demands in the received content; determine a level of the received content based on the identified plurality of response demands; determine the acceptability of the received content based on the identified plurality of response demands; and generate and send an alert to the supervisor device.

20 Claims, 16 Drawing Sheets

(51) Int. Cl.
*G06F 16/22* (2019.01)
*G09B 5/06* (2006.01)

(56) References Cited

U.S. PATENT DOCUMENTS

| | | |
|---|---|---|
| 2015/0228198 A1 | 8/2015 | Brom et al. |
| 2015/0242978 A1* | 8/2015 | Zaslavsky ........... G06F 16/2228 705/326 |
| 2015/0248398 A1 | 9/2015 | Weiss et al. |
| 2016/0034305 A1 | 2/2016 | Shear et al. |

OTHER PUBLICATIONS

Brusilovsky, P ;"Knowledge Tree: A Distributed Architecture for Adaptive E-Learning"; School of Information Sciences, University of Pittsburgh [online]; May 17, 2004 [retrieved May 19, 2017] Retrieved from the Internet: <URL: http://pitt.edu/-peterb/papers/p641-brusilovsky.pdf> all pages.

* cited by examiner

CONTENT BASED REMOTE DATA PACKET INTERVENTION

BACKGROUND

This disclosure relates in general to machine learning and alert provision via machine learning. Machine learning is a subfield of computer science that evolved from the study of pattern recognition and computational learning theory in artificial intelligence. Machine learning explores the construction and study of algorithms that can learn from and make predictions on data. Such algorithms operate by building a model from example inputs in order to make data-driven predictions or decisions, rather than following strictly static program instructions.

Machine learning is closely related to and often overlaps with computational statistics, a discipline that also specializes in prediction-making. It has strong ties to mathematical optimization, which delivers methods, theory and application domains to the field. Machine learning is employed in a range of computing tasks where designing and programming explicit, rule-based algorithms are infeasible. Example applications include spam filtering, optical character recognition (OCR), search engines and computer vision. Machine learning is sometimes conflated with data mining, although that focuses more on exploratory data analysis. Machine learning and pattern recognition can be viewed as two facets of the same field. When employed in industrial contexts, machine learning methods may be referred to as predictive analytics or predictive modelling.

In machine learning and cognitive science, artificial neural networks (ANNs) are a family of statistical learning models inspired by biological neural networks (the central nervous systems of animals, in particular the brain) and are used to estimate or approximate functions that can depend on a large number of inputs and are generally unknown. Artificial neural networks are generally presented as systems of interconnected "neurons" which send messages to each other. The connections have numeric weights that can be tuned based on experience, making neural nets adaptive to inputs and being capable of learning.

Like other machine learning methods—systems that learn from data—neural networks have been used to solve a wide variety of tasks that are hard to solve using ordinary rule-based programming, including computer vision and speech recognition.

While machine learning and alert provision via machine learning are advantageous technologies, new methods and techniques for the application of machine learning and alert provisioning are desired.

BRIEF SUMMARY

One aspect of the present disclosure relates to a system for remote intervention. The system includes memory including: a user profile database including information identifying one or several attributes of a user; a content database including data identifying predetermined content levels and data identifying some of the predetermined content levels as acceptable; and a model database including data identifying a plurality of response demands and data identifying algorithms for determining the plurality of response demands. The system includes a supervisor device including: a network interface that can exchange data via the communication network; and an I/O subsystem that can convert electrical signals to user-interpretable outputs via a user interface. The system includes a content management server.

The content management server can: receive a first electrical signal from the supervisor device, which first electrical signal includes a request for access to a content authoring interface; generate and send an electrical signal to the supervisor device directing the launch of the content authoring interface; receive a second electrical signal from the supervisor device, which second electrical signal includes content received by the content authoring interface; identify a plurality of response demands in the received content; determine a level of the received content based on the identified plurality of response demands; determine the acceptability of the received content based on the identified plurality of response demands; and generate and send an alert to the supervisor device, which alert includes computer code to trigger activation of the I/O subsystem of the supervisor device to provide an indication of the acceptability of the received content and a change recommendation for the received content.

In some embodiments, the response demands include a plurality of linguistic response demands and a plurality of cognitive response demands. In some embodiments, the plurality of linguistic response demands include at least one of: a value indicative of a vocabulary level of the received content; or a value indicative of a syntactic demand such as, for example: a value indicative of a count of prepositional phrases in the received content; or a value indicative of a count of noun phrases in the received content.

In some embodiments, the content management server can determine the vocabulary level of the received content. In some embodiments, determining the vocabulary level of the received content includes: parsing the received content to identify words within the received content; selecting a word; matching the selected word to a tier of words; associating a value indicative of the tier of words with the selected words; and repeating the previous steps until all of the words in the received content have been associated with a value indicative of the tier of words.

In some embodiments, determining the acceptability of the received content based on the identified plurality of response demands includes: retrieving data identifying some of the predetermined content levels as acceptable from the content database; and comparing the determined level of the received content to the data identifying some of the predetermined content levels as acceptable. In some embodiments, determining the acceptability of the received content based on the identified plurality of response demands further includes associating a first value with the received content when the comparison of the determined level of the received content and the data identifying some of the predetermined content levels as acceptable indicates that the determined level of the received content is acceptable. In some embodiments, determining the acceptability of the received content based on the identified plurality of response demands further includes associating a second value with the received content when the comparison of the determined level of the received content and the data identifying some of the predetermined content levels as acceptable indicates that the determined level of the received content is unacceptable.

In some embodiments, the indication of the acceptability of the received content includes data identifying the determined level of the received content as unacceptable. In some embodiments, the change recommendation identifies a portion of the received content for change and includes a recommended change for that portion of the received content.

One aspect of the present disclosure relates to a method for remote intervention. The method includes: receiving a first electrical signal at a content management server from a supervisor device including a network interface and an I/O subsystem, which I/O subsystem can convert electrical signals to user-interpretable outputs via a user interface, and which first electrical signal includes a request for access to a content authoring interface; generating and sending an electrical signal from the content management server to the supervisor device directing the launch of the content authoring interface by the I/O subsystem; receiving a second electrical signal at the content management server from the supervisor device, which second electrical signal includes content received by the content authoring interface; identifying with the content management server a plurality of response demands in the received content; determining with the content management server a level of the received content based on the identified plurality of response demands; determining with the content management server the acceptability of the received content based on the identified plurality of response demands; and generating and sending an alert from the content management server to the supervisor device, which alert triggers activation of the I/O subsystem of the supervisor device to provide an indication of the acceptability of the received content and a change recommendation for the received content.

In some embodiments, the response demands include a plurality of linguistic response demands and a plurality of cognitive response demands. In some embodiments, the plurality of linguistic response demands include at least one of: a value indicative of a vocabulary level of the received content; or a value indicative of a syntactic demand such as, for example: a value indicative of a count of prepositional phrases in the received content; or a value indicative of a count of noun phrases in the received content.

In some embodiments, the method can include determining the vocabulary level of the received content. In some embodiments, determining the vocabulary level of the received content includes: parsing the received content to identify words within the received content; selecting a word; matching the selected word to a tier of words; associating a value indicative of the tier of words with the selected words; and repeating the previous steps until all of the words in the received content have been associated with a value indicative of the tier of words.

In some embodiments, determining the acceptability of the received content based on the identified plurality of response demands includes: retrieving data identifying some of the predetermined content levels as acceptable from the content database; and comparing the determined level of the received content to the data identifying some of the predetermined content levels as acceptable. In some embodiments, determining the acceptability of the received content based on the identified plurality of response demands further includes associating a first value with the received content when the comparison of the determined level of the received content and the data identifying some of the predetermined content levels as acceptable indicates that the determined level of the received content is acceptable. In some embodiments, determining the acceptability of the received content based on the identified plurality of response demands further includes associating a second value with the received content when the comparison of the determined level of the received content and the data identifying some of the predetermined content levels as acceptable indicates that the determined level of the received content is unacceptable.

In some embodiments, the indication of the acceptability of the received content includes data identifying the determined level of the received content as unacceptable. In some embodiments, the change recommendation identifies a portion of the received content for change and includes a recommended change for that portion of the received content.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
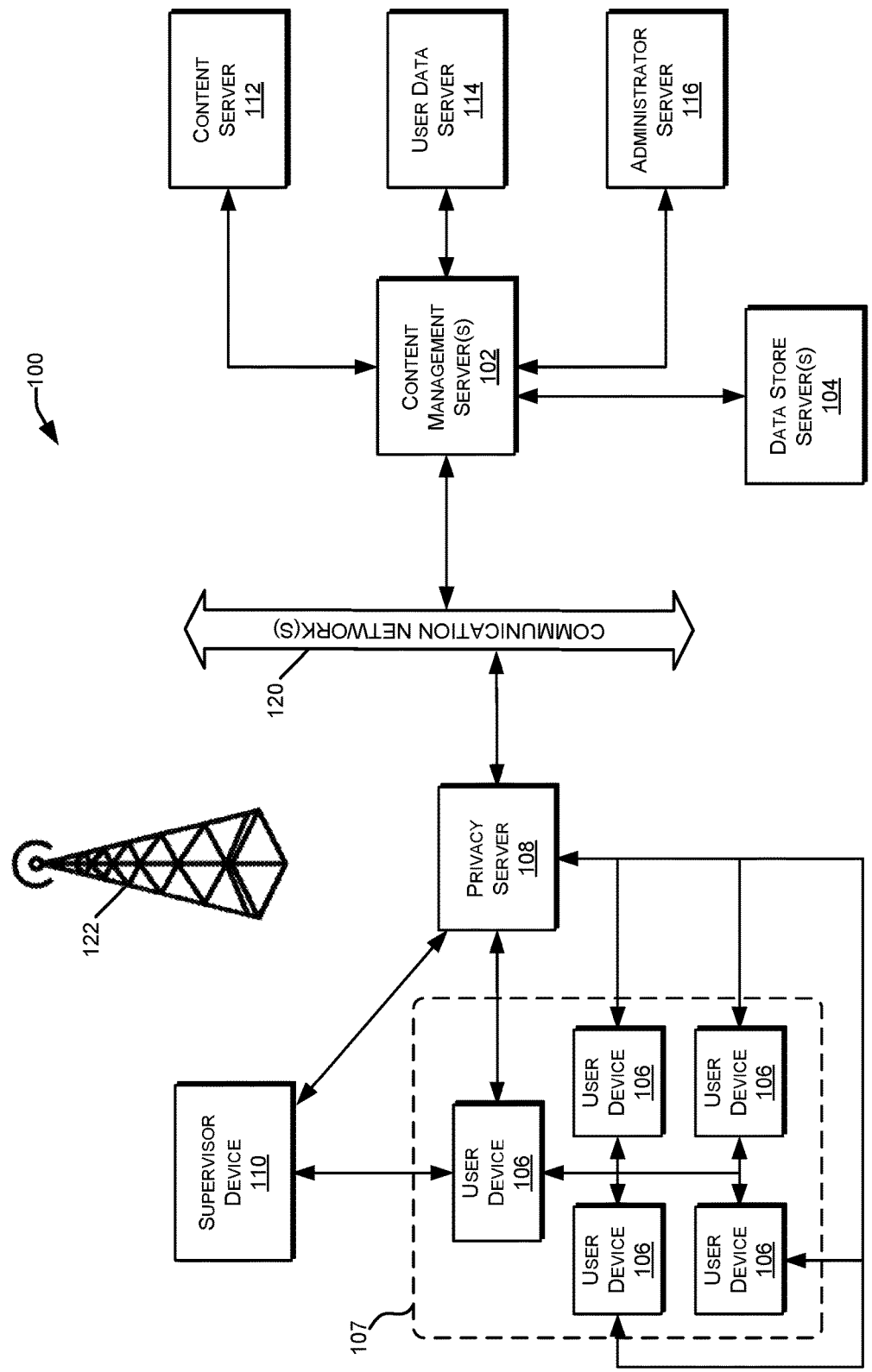
FIG. 1 is a block diagram illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be either or both physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provide access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, an Internet-enabled gaming systems, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including his or her user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine the location of the one or several components of the content distribution network 100 via, for example, triangulation. All of these are depicted as navigation system 122.

In some embodiments, navigation system 122 can include one or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
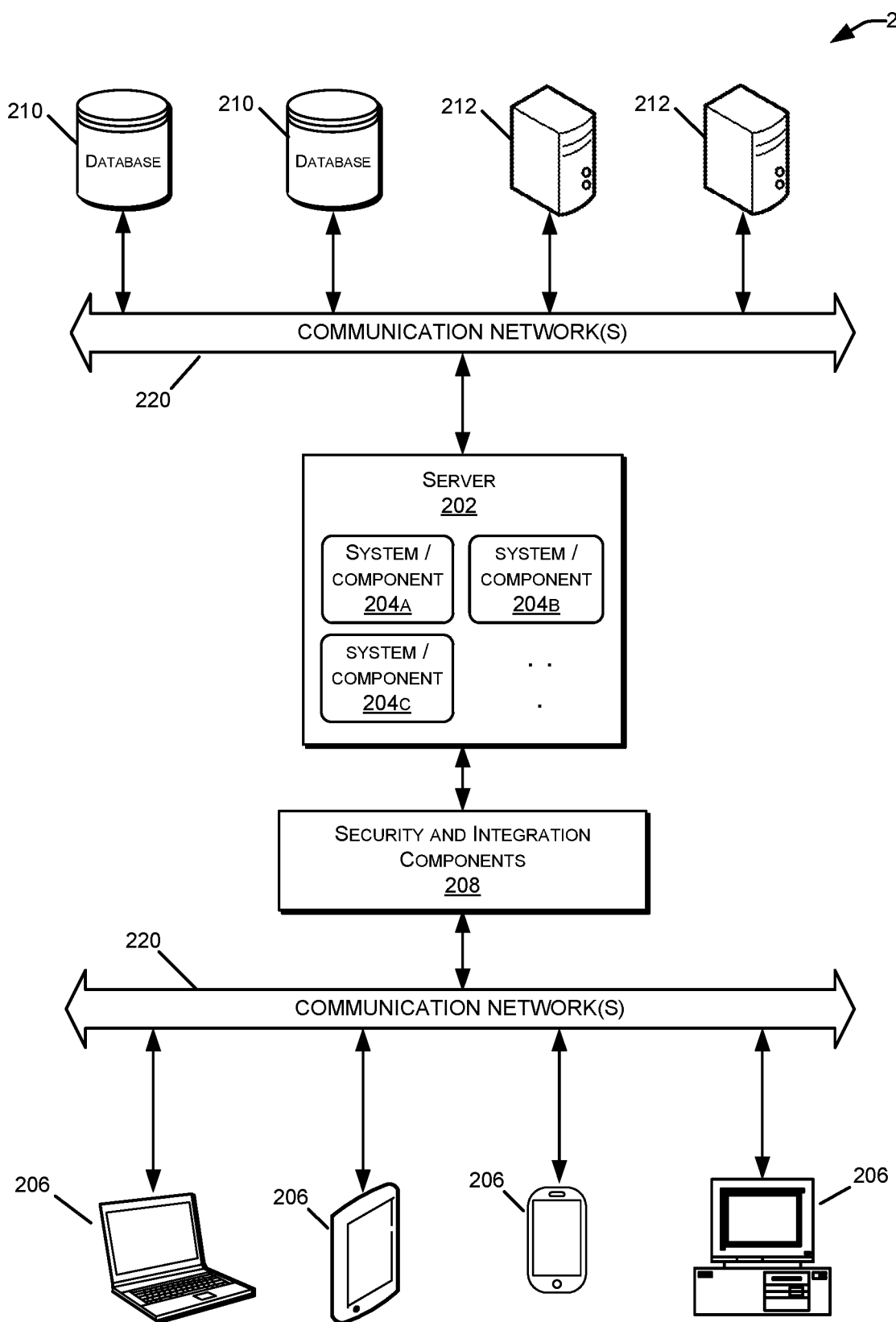
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser-based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
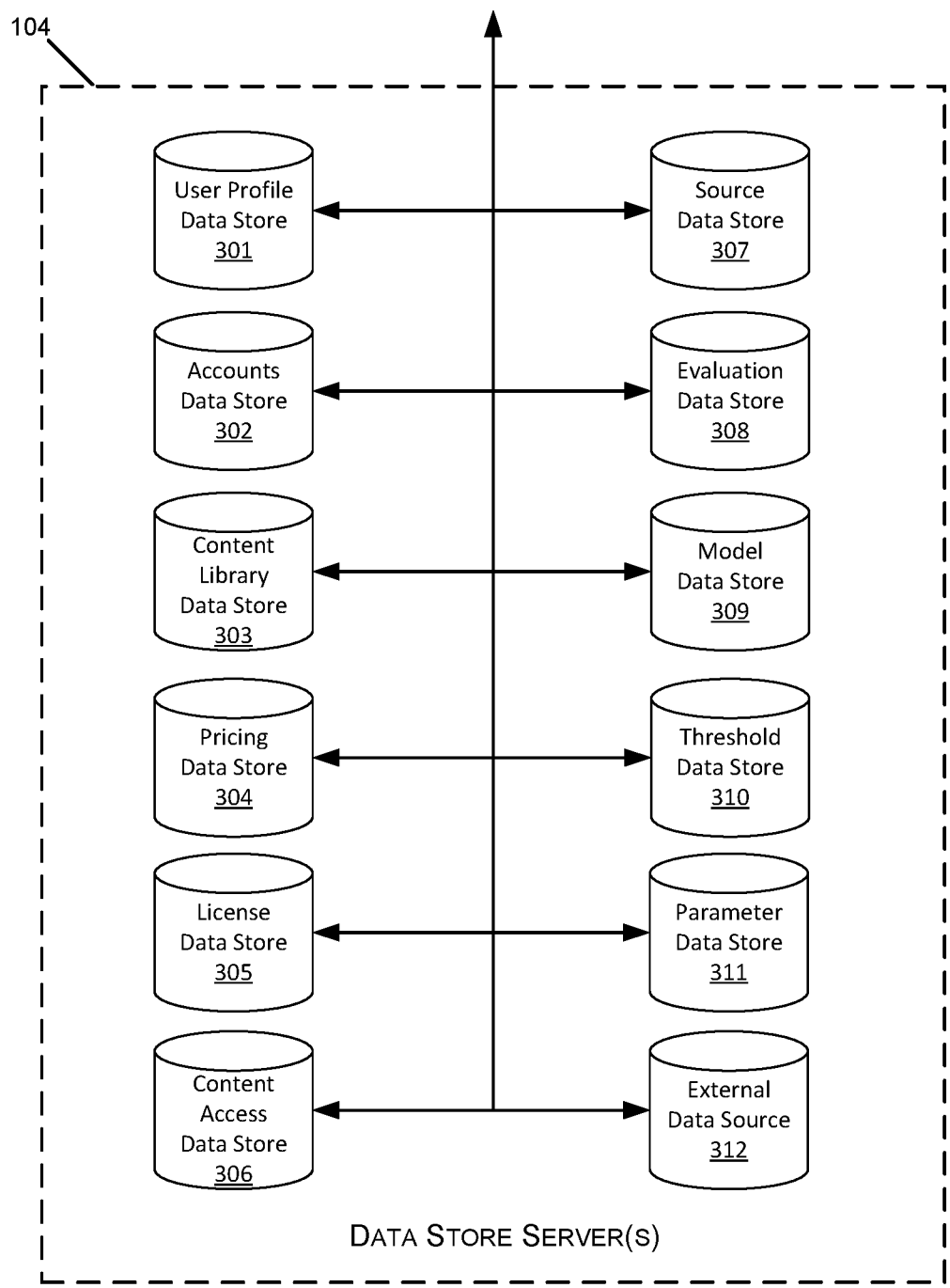
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-312 may reside in storage on a single computer server 104 (or a single server farm or cluster) under the control of a single entity, or may reside on separate servers operated by different entities and/or at remote locations. In some embodiments, data stores 301-312 may be accessed by the content management server 102 and/or other devices and servers within the network 100 (e.g., user devices 106, supervisor devices 110, administrator servers 116, etc.). Access to one or more of the data stores 301-312 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-312, including their functionality and types of data stored therein, are illustrative and non-limiting. Data stores server architecture, design, and the execution of specific data stores 301-312 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, content authors, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

In some embodiments, the user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the user, also referred to herein as the student or the student-user, may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library database 303 can comprise information to facilitate in authoring new content. This information can comprise, for example, one or several specifications identifying attributes and/or requirements of desired newly authored content. In some embodiments, for example, a content specification can identify one or several of a subject matter; length, difficulty level, or the like for desired newly authored content.

In some embodiments, the content library database 303 can further include information for use in evaluating newly authored content. In some embodiments, this evaluation can comprise a determination of whether and/or the degree to which the newly authored content corresponds to the content specification, or some or all of the requirements of the content specification. In some embodiments, this information for use in evaluation newly authored content can identify or define one or several difficulty levels and/or can identify or define one or several acceptable difficulty levels. In some embodiments, for example, this information for use in evaluation of newly authored content can define a plurality of difficulty levels and can delineate between these difficulty levels, and in some embodiments, this information for use in evaluation of newly authored content can identify which of the defined difficulty levels are acceptable. In other embodiments, this information for use in evaluation of newly authored content can merely include one or several definitions of acceptable difficulty levels, which acceptable difficulty level can be based on one or several pre-existing difficult measures such as, for example, an Item Response Theory (IRT) value such as, for example, an IRT b value, a p value indicative of the proportion of correct responses in a set of responses, a grade level, or the like.

In some embodiments, this information for use in evaluation of newly authored content can further define one or several differentiation and/or discrimination levels and/or define one or several acceptable differentiation and/or discrimination levels or ranges. As used herein, "differentiation" and "discrimination" refer to the degree to which an item such as a question identifies low ability versus high ability users. In some embodiments, this information for use in evaluation of newly authored content can identify one or several acceptable levels and/or ranges of discrimination which levels and/or ranges can be based on one or several currently existing discrimination measures such as, for example, a Point-Biserial Correlation.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A model data store 309, also referred to herein as a model database 309 can store information relating to one or several predictive models. In some embodiments, these one or several predictive models can be used to generate a predictive evaluation. As used herein, a "predictive evaluation" is a prediction of the difficulty and/or discrimination of a data packet which can include, for example, an item such as a question and/or newly authored content. In some embodiments, the one or several predictive models can include one or several algorithms and/or one or several features and/or parameters. As used herein, a "feature" refers to raw data extracted from content. By way of example, in written content, each prepositional phrase could be a "feature." As used herein, a "parameter" or a "response demand" is data generated from one or several features of content. By way of example, a parameter can be the sum of some or all of the features extracted from content, a ratio of a first set of features to a second set of features, or the like.

In some embodiments, the parameters identified within the model database 309 can comprise one or several algorithms and/or one or several lines of executable code for calculating and/or determining the parameters. In some embodiments, these parameters can include one or several linguistic parameters, also referred to herein as "linguistic response demands," and/or one or several cognitive parameters, also referred to herein as "cognitive response demands." In some embodiments, linguistic parameters characterize the difficulty of the language of content, whereas the cognitive parameters characterize the difficulty of task associated with the content (e.g., the difficulty of responding to the content). Several linguistic parameters are identified in Table 1, below; several cognitive parameters are identified in Table 2, below; and several content parameters are identified in Table 3, below. Some of the linguistic parameters of Table 1 can be identified as syntactic parameters or syntactic demands. These include, for example: dependent clauses; prepositional phrases; complex noun phrases; complex verb phrases; and passive voice.

TABLE 1

List of Linguistic Parameters

| Parameter | Description/Reference describing Parameter |
|---|---|
| Reading Maturity Metric | This parameter identifies readability and is based on a combination of semantic, structural, and vocabulary features of content. |
| Dependent Clauses | This parameter is a count of the number of groups of words that includes a subject and a verb but that does not, by itself, form a sentence. Types of dependent clauses include, for example, subordinate clauses, relative clauses, and complement clauses. |
| Prepositional phrases | This parameter is a count of the number of prepositional phrases in content. |
| Complex Noun Phrases | The parameter is a count of the number of noun phrases in which the head noun or head noun phrase is elaborated by a dependent clause or by one or more prepositional phrases. |
| Complex Verb Phrases | This parameter is a count of the number of complex verb phrases. Complex verb phrases include:<br>    Modal present progressive phrases (e.g., must be reading, would be reading);<br>    Modal present perfect phrases (e.g., must have read, could have read);<br>    Present perfect progressive phrases (e.g., have been reading);<br>    Modal present perfect progressive phrases (e.g., should have been reading);<br>    Past perfect progressive phrases (e.g., had been reading);<br>    Future perfect phrases (e.g., will have read); and<br>    Future perfect progressive phrases (e.g., will have been reading). |
| Passive Voice | This parameter is a count of the number of instances of passive voice in the content. |
| Tier 1 Vocabulary | This parameter is a count of the number of instances of vocabulary belonging to Tier 1. Tier 1 vocabulary can include general words. |
| Tier 2 Vocabulary | This parameter is a count of the number of instances of vocabulary belonging to Tier 2. Tier 2 vocabulary can include core academic words. |

TABLE 1-continued

List of Linguistic Parameters

| Parameter | Description/Reference describing Parameter |
| --- | --- |
| Tier 3 Vocabulary | This parameter is a count of the number of instances of vocabulary belonging to Tier 3. Tier 3 vocabulary can include technical and/or domain specific words. |
| Word Count | This parameter is a count of the total number of words in the content. |

TABLE 2

List of Cognitive Parameters

| Parameter | Description/Reference describing Parameter |
| --- | --- |
| Depth of Knowledge | This parameter categorizes data packets according to the complexity of thinking required to successfully complete them and/or respond to them. This parameter can be based on a Webb's Depth of Knowledge Level, in which a 1 corresponds to recall and reproduction, a 2 corresponds to skills and concepts, a 3 corresponds to short-term strategic thinking, and a 4 corresponds to extended thinking. This can be a categorical parameter. |
| Reading Load | This parameter is a measure of the amount and complexity of textual and visual information in the content that is processed in order to correctly respond to the content. This parameter can be a categorical parameter. |
| Relational Complexity | This parameter identifies the number of facts, concepts, processes, or the like, used to provide a successful response to a data packet. This parameter can be a count. |
| Visualization/Graphic | This parameter identifies whether a data packet includes internal visualizations or graphics, external visualizations or graphics, both internal and external visualizations or graphics, or neither internal nor external visualizations or graphics. This parameter can be a categorical parameter. |
| Item Type | This parameter identifies the type of a data packet. In embodiments, in which the data packet is a question, the type can be, for example, a true/false, multiple choice, constructed response, and/or technology-enhanced. This parameter is categorical. |

TABLE 3

List of Content Parameters

| Parameter | Description/Reference describing Parameter |
| --- | --- |
| Maximum Points | This parameter identifies the maximum number of points available for a data packet. |
| Standard | This parameter identifies whether a data packet is associated with a standard such as, for example, an education standard. This parameter can be categorical, and have a first category if the data packet is not associated with a standard, and have a second category if the data packet is associated with a standard. |
| Grade-level Equivalent | This parameter identifies the alignment between the data packet and one or several grade-level learning objectives. In some embodiments, this parameter can identify the grade level to which the data packet corresponds based on, for example, the difficulty of the data packet. |

In some embodiments, the model database 309 can comprise one or several databases that comprise data relevant to the parameters. In some embodiments, these can comprise lists of, for example, words, phrases, clauses, difficulty levels, or the like. In one embodiment, the model database 309 can comprise a list of Tier 1 words, a list of Tier 2 words, and a list of Tier 3 words. In some embodiments, these lists can be used in identifying whether a word in the content of the data packet is Tier 1, Tier 2, or Tier 3.

In some embodiments, these algorithms can implement one or several machine learning techniques including, for example: decision tree learning, including, for example Random Forest or conditional inference trees methods; Neural Networks; Support Vector Machines; Clustering; and Bayesian Networks. These algorithms can comprise computer executable code that can be retrieved by the server 102 and used to generate a predictive evaluation of the difficulty of a data packet.

A threshold database 310, also referred to herein as a threshold database, can store one or several threshold values. These one or several threshold values can delineate between states or conditions. In one exemplary embodiment, for example, a threshold value can delineate between an acceptable user performance and an unacceptable user performance, between content appropriate for a user and content that is inappropriate for a user, between risk levels, or the like.

In addition to the illustrative data stores described above, data store server(s) 104 (e.g., database servers, file-based storage servers, etc.) may include one or more external data aggregators 312. External data aggregators 312 may include third-party data sources accessible to the content management network 100, but not maintained by the content management network 100. External data aggregators 312 may include any electronic information source relating to the users, content resources, or applications of the content distribution network 100. For example, external data aggregators 312 may be third-party data stores containing demographic data, education related data, consumer sales data, health related data, and the like. Illustrative external data aggregators 312 may include, for example, social networking web servers, public records data stores, learning management systems, educational institution servers, business servers, consumer sales data stores, medical record data stores, etc. Data retrieved from various external data aggregators 312 may be used to verify and update user account information, suggest user content, and perform user and content evaluations.

Figure 4A:
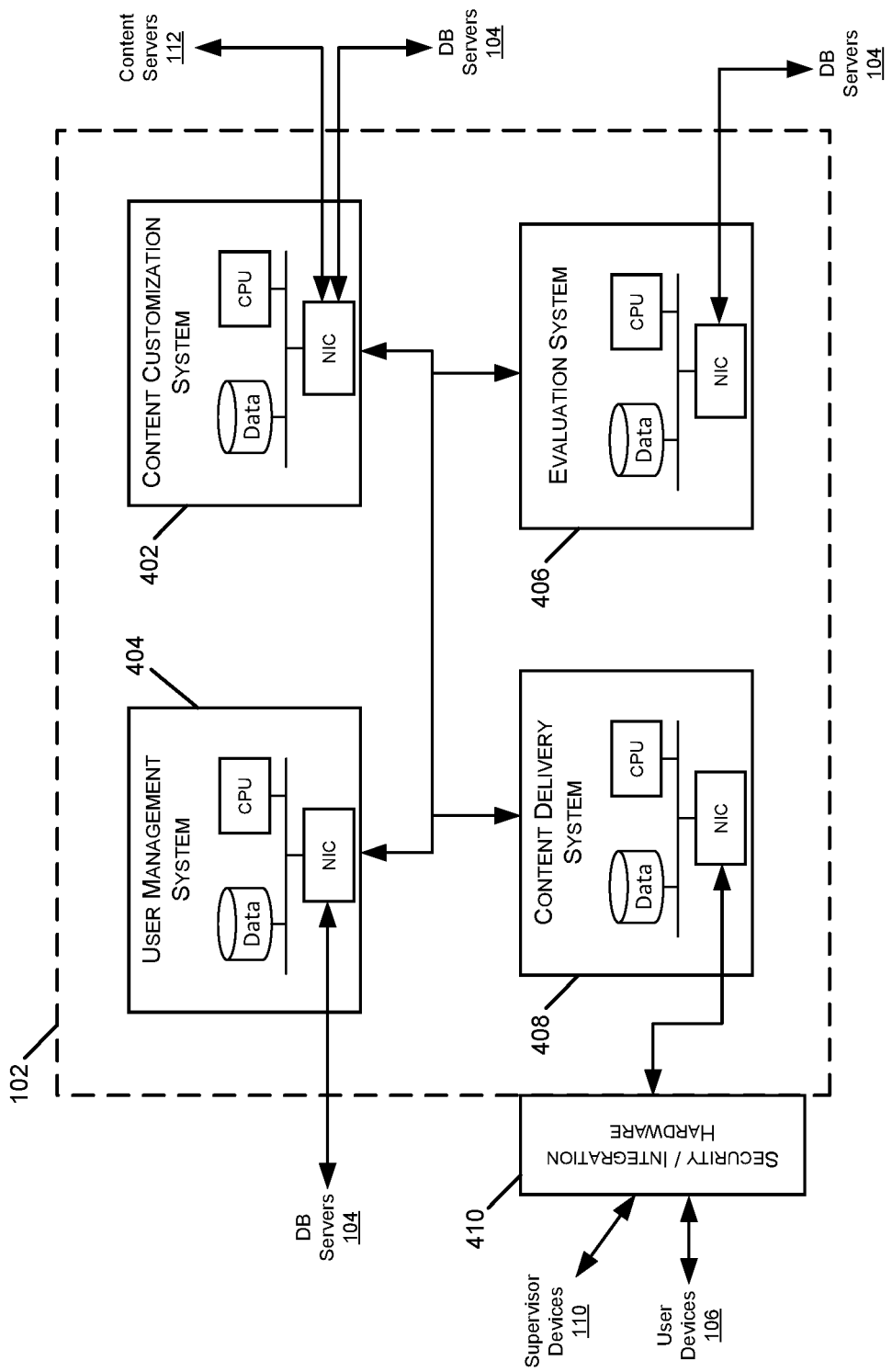
FIG. 4A is a block diagram illustrating an embodiment of one or more content management servers within a content distribution network.

With reference now to FIG. 4A, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

In some embodiments, the content management system 402 can include a recommendation engine, also referred to herein as an adaptive recommendation engine. In some embodiments, the recommendation engine can select one or several pieces of content, also referred to herein as data packets, for providing to a user. These data packets can be selected based on, for example, the information retrieved from the database server 104 including, for example, the user profile database 301, the content library database 303, the model database 309, or the like. In one embodiment, for example, the recommendation engine can retrieve information from the user profile database 301 identifying, for example, a skill level of the user. The recommendation engine can further retrieve information from the content library database 303 identifying, for example, potential data packets for providing to the user and the difficulty of those data packets and/or the skill level associated with those data packets.

The recommendation engine can use the evidence model to generate a prediction of the likelihood of one or several users providing a desired response to some or all of the potential data packets. In some embodiments, the recommendation engine can pair one or several data packets with selection criteria that may be used to determine which packet should be delivered to a student-user based on one or several received responses from that student-user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406, also referred to herein as a response processor. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the evaluation system 406 can be further configured to receive one or several responses from the user and to determine whether the one or several responses are correct responses, also referred to herein as desired responses, or are incorrect responses, also referred to herein as undesired responses. In some embodiments, one or several values can be generated by the evaluation system 406 to reflect user performance in responding to the one or several data packets. In some embodiments, these one or several values can comprise one or several scores for one or several responses and/or data packets.

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 can include a presentation engine that can be, for example, a software module running on the content delivery system.

The content delivery system 408, also referred to herein as the presentation module or the presentation engine, may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 4B:
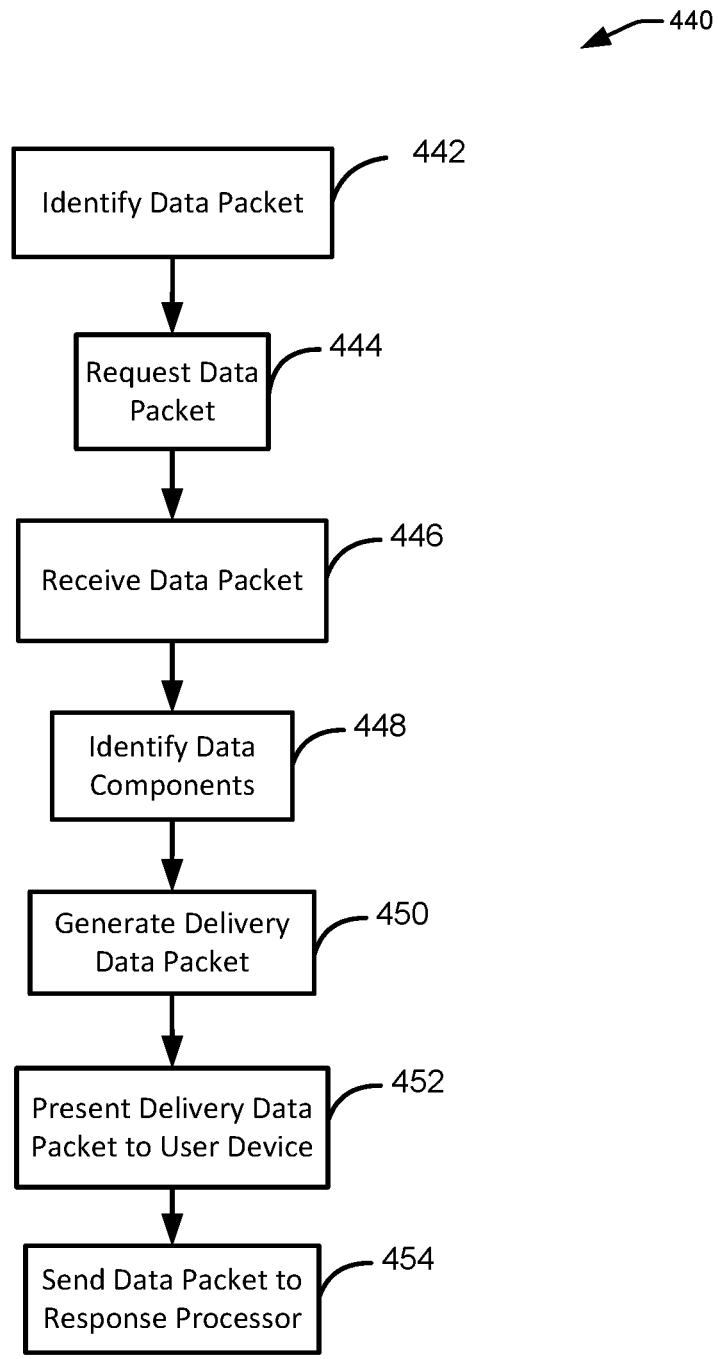
FIG. 4B is a flowchart illustrating one embodiment of a process for data management.

With reference now to FIG. 4B, a flowchart illustrating one embodiment of a process 440 for data management is shown. In some embodiments, the process 440 can be performed by the content management server 102, and more specifically by the content delivery system 408 and/or by the presentation module or presentation engine. The process 440 begins at block 442, wherein a data packet is identified. In some embodiments, the data packet can be a data packet for providing to a student-user, and the data packet can be identified by determining which data packet to next provide to the user such as the student-user. In some embodiments, this determination can be performed by the content customization system 402 and/or the recommendation engine.

After the data packet has been identified, the process 440 proceeds to block 444, wherein the data packet is requested. In some embodiments, this can include the requesting of information relating to the data packet such as the data forming the data packet. In some embodiments, this information can be requested from, for example, the content library database 303. After the data packet has been requested, the process 440 proceeds to block 446, wherein the data packet is received. In some embodiments, the data packet can be received by the content delivery system 408 from, for example, the content library database 303.

After the data packet has been received, the process 440 proceeds to block 448, wherein one or several data components are identified. In some embodiments, for example, the data packet can include one or several data components which can, for example, contain different data. In some embodiments, one of these data components, referred to herein as a presentation component, can include content for providing to the student user, which content can include one or several requests and/or questions and/or the like. In some embodiments, one of these data components, referred to herein as a response component, can include data used in evaluating one or several responses received from the user device 106 in response to the data packet, and specifically in response to the presentation component and/or the one or several requests and/or questions of the presentation component. Thus, in some embodiments, the response component of the data packet can be used to ascertain whether the user has provided a desired response or an undesired response.

After the data components have been identified, the process 440 proceeds to block 450, wherein a delivery data packet is identified. In some embodiments, the delivery data packet can include the one or several data components of the data packets for delivery to a user such as the student-user via the user device 106. In some embodiments, the delivery packet can include the presentation component, and in some embodiments, the delivery packet can exclude the response packet. After the delivery data packet has been generated, the process 440 proceeds to block 452, wherein the delivery data packet is presented to the user device 106. In some embodiments, this can include providing the delivery data packet to the user device 106 via, for example, the communication network 120.

After the delivery data packet has been provided to the user device, the process 440 proceeds to block 454, wherein the data packet and/or one or several components thereof is sent to and/or provided to the response processor. In some embodiments, this sending of the data packet and/or one or several components thereof to the response processor can include receiving a response from the student-user, and sending the response to the student-user to the response processor simultaneously with the sending of the data packet and/or one or several components thereof to the response processor. In some embodiments, for example, this can include providing the response component to the response processor. In some embodiments, the response component can be provided to the response processor from the content delivery system 408.

Figure 4C:
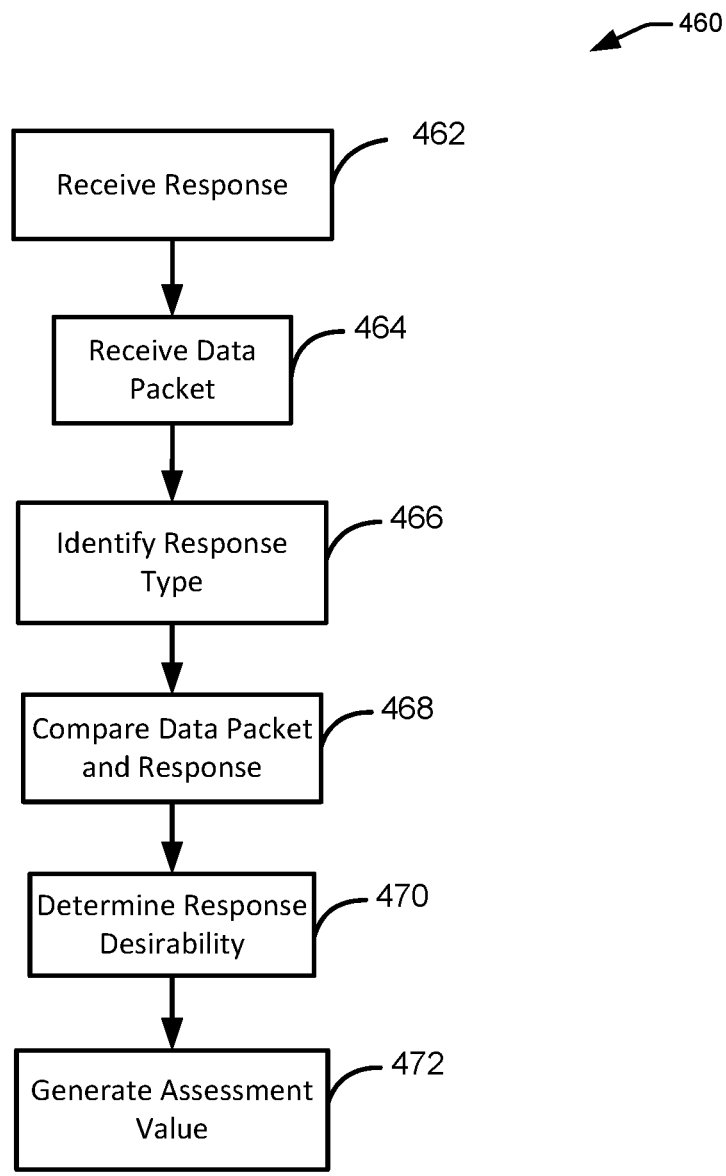
FIG. 4C is a flowchart illustrating one embodiment of a process for evaluating a response.

With reference now to FIG. 4C, a flowchart illustrating one embodiment of a process 460 for evaluating a response is shown. In some embodiments, the process can be performed by the evaluation system 406. In some embodiments, the process 460 can be performed by the evaluation system 406 in response to the receipt of a response from the user device 106.

The process 460 begins at block 462, wherein a response is received from, for example, the user device 106 via, for example, the communication network 120. After the response has been received, the process 460 proceeds to block 464, wherein the data packet associated with the response is received. In some embodiments, this can include receiving all or one or several components of the data packet such as, for example, the response component of the data packet. In some embodiments, the data packet can be received by the response processor from the presentation engine.

After the data packet has been received, the process 460 proceeds to block 466, wherein the response type is identified. In some embodiments, this identification can be performed based on data, such as metadata associated with the response. In other embodiments, this identification can be performed based on data packet information such as the response component.

In some embodiments, the response type can identify one or several attributes of the one or several requests and/or questions of the data packet such as, for example, the request and/or question type. In some embodiments, this can include identifying some or all of the one or several requests and/or questions as true/false, multiple choice, short answer, essay, or the like.

After the response type has been identified, the process 460 proceeds to block 468, wherein the data packet and the response are compared to determine whether the response comprises a desired response and/or an undesired response. In some embodiments, this can include comparing the received response and the data packet to determine if the received response matches all or portions of the response component of the data packet, to determine the degree to which the received response matches all or portions of the response component, to determine the degree to which the receive response embodies one or several qualities identified in the response component of the data packet, or the like. In some embodiments, this can include classifying the response according to one or several rules. In some embodiments, these rules can be used to classify the response as either desired or undesired. In some embodiments, these rules can be used to identify one or several errors and/or misconceptions evidenced in the response. In some embodiments, this can include, for example: use of natural language processing software and/or algorithms; use of one or several digital thesauruses; use of lemmatization software, dictionaries, and/or algorithms; or the like.

After the data packet and the response have been compared, the process 460 proceeds to block 470 wherein response desirability is determined. In some embodiments this can include, based on the result of the comparison of the data packet and the response, whether the response is a desired response or is an undesired response. In some embodiments, this can further include quantifying the degree to which the response is a desired response. This determination can include, for example, determining if the response is a correct response, an incorrect response, a partially correct response, or the like. In some embodiments, the determination of response desirability can include the generation of a value characterizing the response desirability and the storing of this value in one of the databases 104 such as, for example, the user profile database 301. After the response desirability has been determined, the process 460 proceeds to block 472, wherein an assessment value is generated. The assessment value can be an aggregate value characterizing response desirability for one or more of a plurality of responses. This assessment value can be stored in one of the databases 104 such as the user profile database 301.

Figure 5:
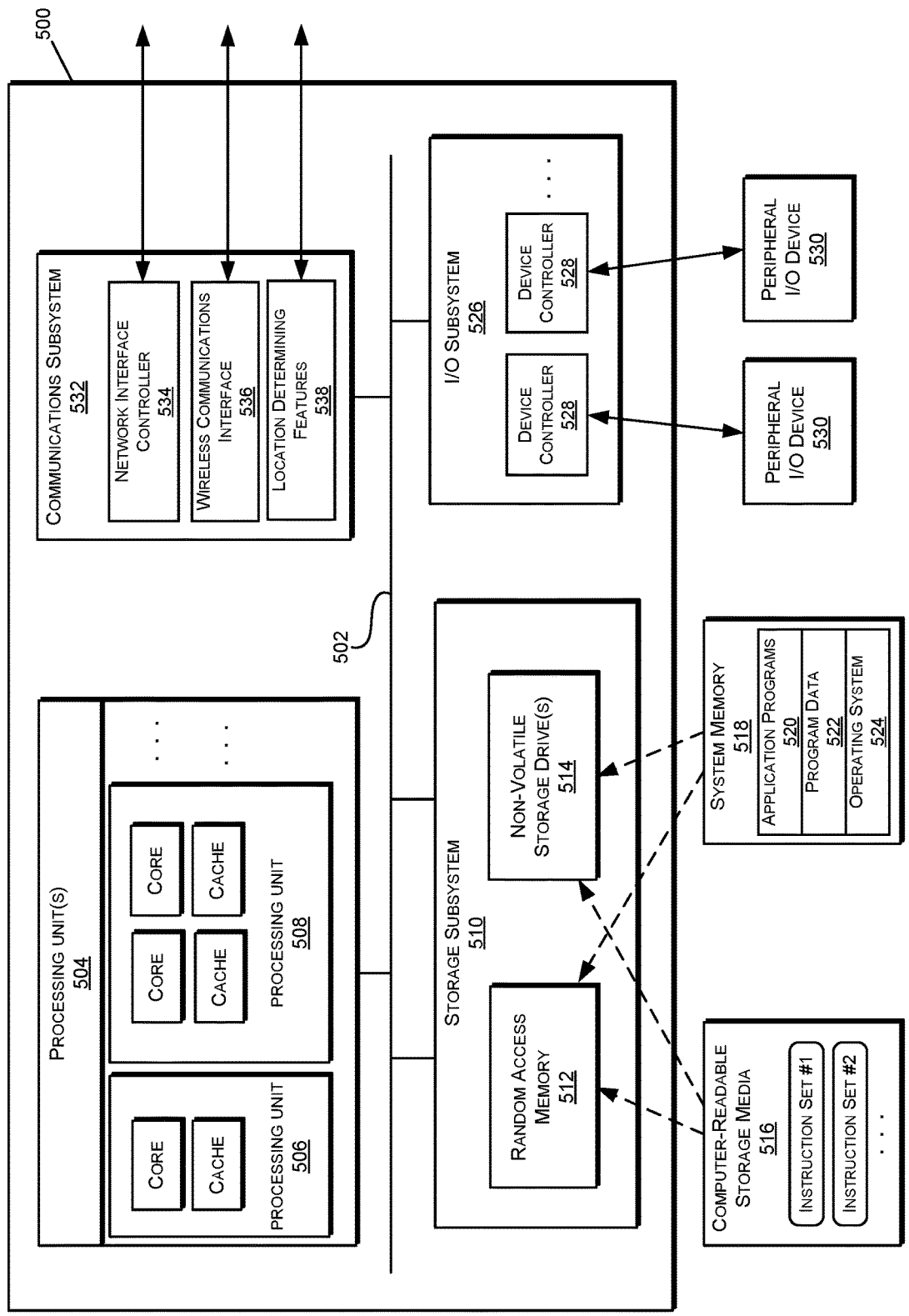
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater).

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.). The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during startup, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11) family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 312). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
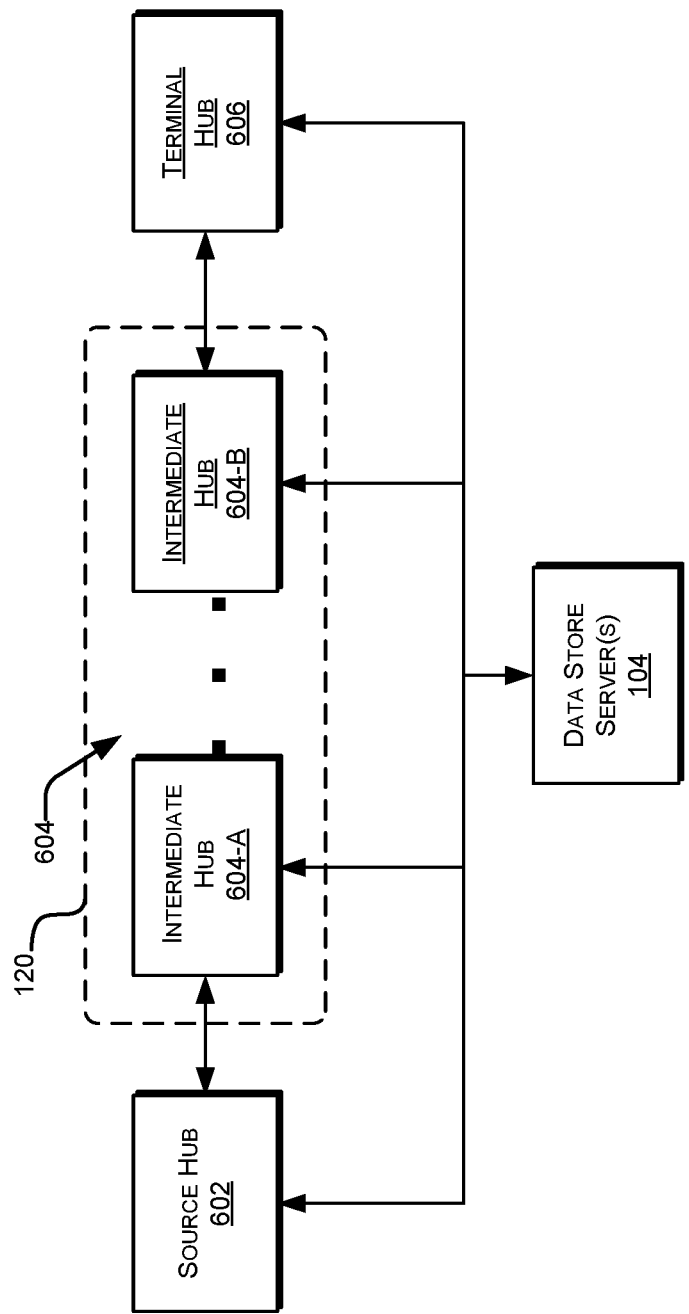
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such an embodiment, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
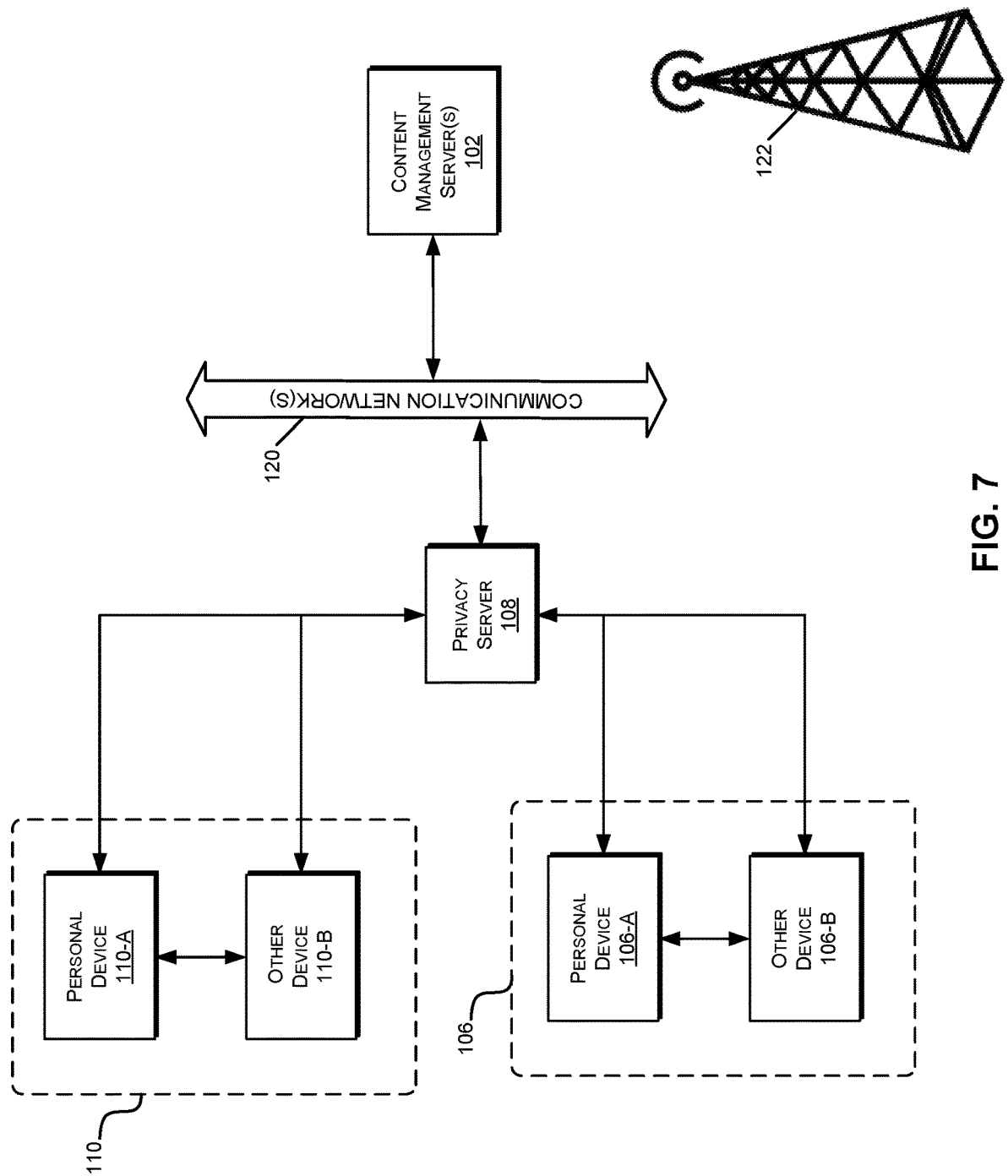
FIG. 7 is a block diagram illustrating one embodiment of a user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 7, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor device 110-A and the one or several other supervisor devices 110-B can be communicatingly connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert.

In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using an other device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in the alert and/or an indicator of the alert.

Figure 8:
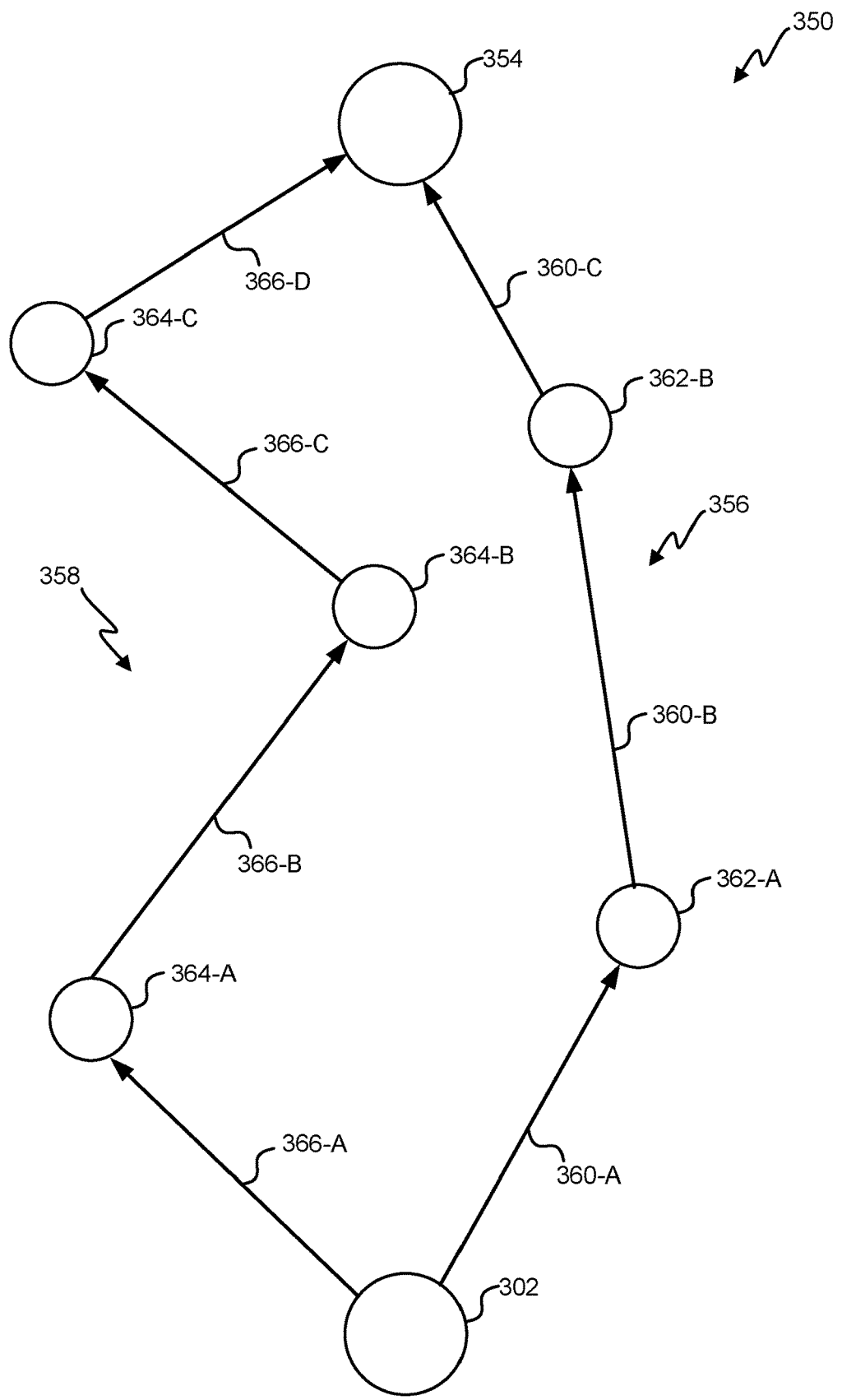
FIG. 8 is a schematic illustration of one embodiment of a neural network containing two indicated sequences.

With reference now to FIG. 8, a schematic illustration of one embodiment of the object network 350 is shown. In some embodiments, the object network 350 can comprise a plurality of data objects connected via a plurality of connecting vectors. In the embodiment depicted in FIG. 8, the object network 350 includes a starting data object 352 and a destination data object 354. As seen in FIG. 8, the starting data object 352 and the destination data object 354 are connected by a first sequence 356 and a second sequence 358. The first sequence 356 comprises data objects 362-A and 362-B which are connected with each other and with both of the starting object 352 and the destination object 354 via connecting vectors 360-A, 360-B, and 360-C, also referred to herein as learning vectors. Similarly, the second sequence 358 comprises data objects 364-A, 364-B, and 364 C, which are connected with each other and with both of the starting data object 352 and the destination data object 354 via connecting vectors 366-A, 366-B, 366-C, and 366-D. As seen in FIG. 8, the magnitude of the connecting vectors 360-A, 360-B, 360-C, 366-A, 366-B, 366-C, 366-D varies between objects, and some of the connecting vectors 360-A, 360-B, 360-C, 366-A, 366-B, 366-C, 366-D have a greater magnitude than others of the connecting vectors 360-A, 360-B, 360-C, 366-A, 366-B, 366-C, 366-D. Similarly, some of the connecting vectors 360-A, 360-B, 360-C, 366-A, 366-B, 366-C, 366-D have a lesser magnitude than others of the connecting vectors 360-A, 360-B, 360-C, 366-A, 366-B, 366-C, 366-D. As further seen, the aggregate magnitude of the first sequence 356, which aggregate magnitude is the sum of the magnitudes of the connecting vectors 360-A, 360-B, 360-C in the first sequence 356, is less than the aggregate magnitude of the second sequence 358, which aggregate magnitude is the sum of the magnitudes of the connecting vectors 366-A, 366-B, 366-C, 366-D in the second sequence 358. In some embodiments, the magnitude of the connecting vectors 360-A, 360-B, 360-C, 366-A, 366-B, 366-C, 366-D and/or the magnitude of the sequence 356, 358 can correspond to the length of time required to complete a connecting vector 360-A, 360-B, 360-C, 366-A, 366-B, 366-C, 366-D and/or a sequence 356, 358, by the effectiveness and teaching mastery of the subject matter of the same.

Figure 9:
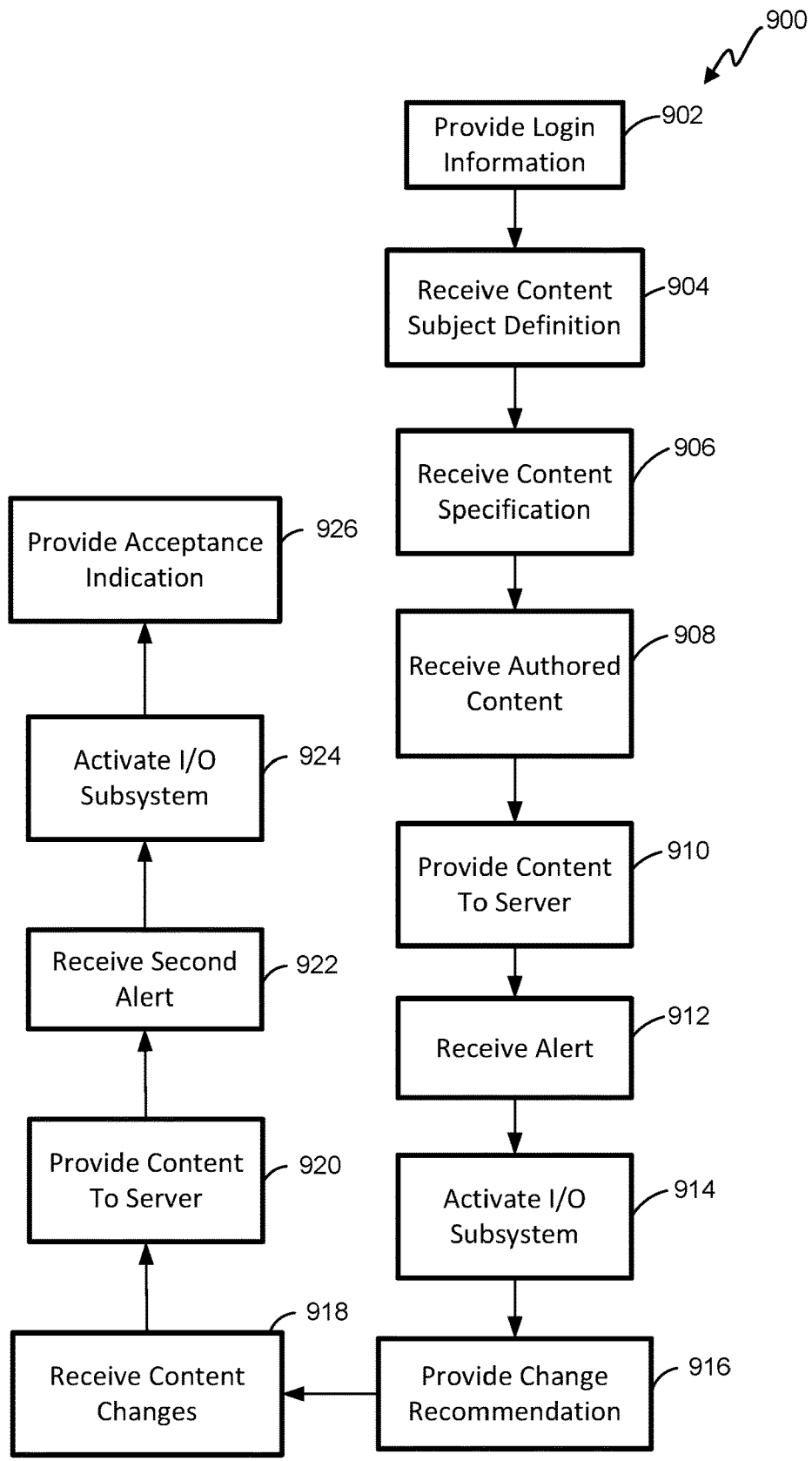
FIG. 9 is a flowchart illustrating one embodiment of a process for automatic content evaluation-based alert reception.

With reference now to FIG. 9, a flowchart illustrating one embodiment of a process 900 for automatic content evaluation-based alert reception is shown. The process 900 can be performed using some or all the components of the content distribution network 100, and can be specifically performed by a user at one or several supervisor devices 110.

The process 900 begins at block 902 wherein login information is provided. In some embodiments, this can include the receipt of the login information by the supervisor device 110 from the user via the I/O subsystem 526. In some embodiments, the login information can comprise one or more of a user ID, password, a unique user identifier, or the like. After the login information has been received by the supervisor device 110, login information can be provided to the server 102 via the communication subsystem 532 of the supervisor device 100 and the communication network 120 to the content management server 102.

After the login information has been provided, the process 900 proceeds to block 904 wherein the content subject definition is received. In some embodiments, the content subject definition can comprise information received from the user of the supervisor device 110 identifying one or several attributes of the to be authored data packet. In some embodiments, these one or several attributes can specify, for example, relationship of the to be authored content to pre-existing content, to one or several assessments, to one or several tasks, or the like. In some embodiments, the supervisor device 110 can provide the content subject definition to the server 102 via the communication network 120 and via the communications subsystem 532 of the supervisor device 110.

After the content subject definition has been received, the process 900 proceeds to block 906 wherein a content specification is received. In some embodiments, the content specification can identify one or several of a subject matter; length, difficulty level, or the like for desired newly authored content. The content specification can be received from the server 102 via the communication network 120 and via the communications subsystem 532 of the supervisor device 110. In some embodiments, the server 102 can identify the content specification, which can be stored in the database server 104, based on the content subject definition received from the supervisor device 110, and the server 102 can retrieve the content specification from the database server 104.

After the content specification has been received, the process 900 proceeds to block 908 wherein authored content is received by the supervisor device 110 via the I/O subsystem 526. In some embodiments, the author content can comprise one or several characters, text strings, images, graphical data depictions, video clips, audio clips, or the like. After the authored content has been received, the process 900 proceeds to block 910 wherein the authored content is provided to the server 102 via, for example, the communication network 120 and the communications subsystem 532 of the supervisor device 110.

After the authored content has been provided to the server 102, the process 900 proceeds to block 912 wherein an alert is received by the supervisor device 110. In some embodiments, the alert is received by the supervisor device 110 via the communication network 120 and the communication subsystem 532 from the server 102. In some embodiments, the alert can be configured to activate the I/O subsystem 526. Specifically, in some embodiments the alert can comprise computer code and/or features that when received by the supervisor device 110 trigger activation of the I/O subsystem 526.

In some embodiments, the alert can further comprise an indication of the acceptability of the authored content and/or one or several change recommendations for the authored content. In some embodiments, the indication of the acceptability can indicate whether the authored content sufficiently complies with the content specification. In some embodiments, the one or several change recommendations can identify one or several proposed changes to the authored content (data packet) to increase the acceptability of the data packet and/or to make the data packet acceptable.

After the alert has been received, the process 900 proceeds to block 914, wherein I/O subsystem 526 is activated. In some embodiments, the I/O subsystem 526 can be activated with information and/or computer code contained within the alert. After the I/O subsystem 526 has been activated, the process 900 proceeds to block 916, wherein one or several change recommendations are provided. In some embodiments, the one or several change recommendations can be provided to the user of the supervisor device 110, along with any other desired information received in or with the alert, via, for example, a screen, a speaker, or the like.

After the change recommendation has been provided, the process 900 proceeds to block 918, wherein one or several content changes are received. In some embodiments, the one or several content changes can be received by the supervisor device 110 from the user of the supervisor device. In some embodiments, the content changes can be received in the form of one or several acceptances of one or several of the change recommendations. After the content changes have been received, the process 900 proceeds to block 920, wherein the updated authored content and/or the content changes are provided to the server 102. In some embodiments, these can be provided to the server 102 via the communication network 120 and/or the communications subsystem 532.

After the content has been provided to the server, the process 900 proceeds to block 922 wherein a second alert is received by the supervisor device 110. In some embodiments, the second alert is received by the supervisor device 110 via the communication network 120 and the communication subsystem 532 from the server 102. In some embodiments, the second alert can be configured to activate the I/O subsystem 526. Specifically, in some embodiments the alert can comprise computer code and/or features that when received by the supervisor device 110 trigger activation of the I/O subsystem 526. In some embodiments, the second alert can be generated by the server 102 based on an evaluation of the content changes received in block 918. In some embodiments, the alert can further comprise an indication of the acceptability of the authored content and/or one or several change recommendations for the authored content. In some embodiments, and as depicted in FIG. 9, the second alert can comprise an acceptance indication identifying the compliance of the authored content including any content changes of block 918 with the content specification.

After the second alert has been received, the process 900 proceeds to block 924, wherein I/O subsystem 526 is activated. In some embodiments, the I/O subsystem 526 can be activated with information and/or computer code contained within the alert. After the I/O subsystem 526 has been activated, the process 900 proceeds to block 926, wherein the acceptance indication is provided to the user of the supervisor device 110, along with any other desired information received in or with the alert, via, for example, a screen, a speaker, or the like.

Figure 10:
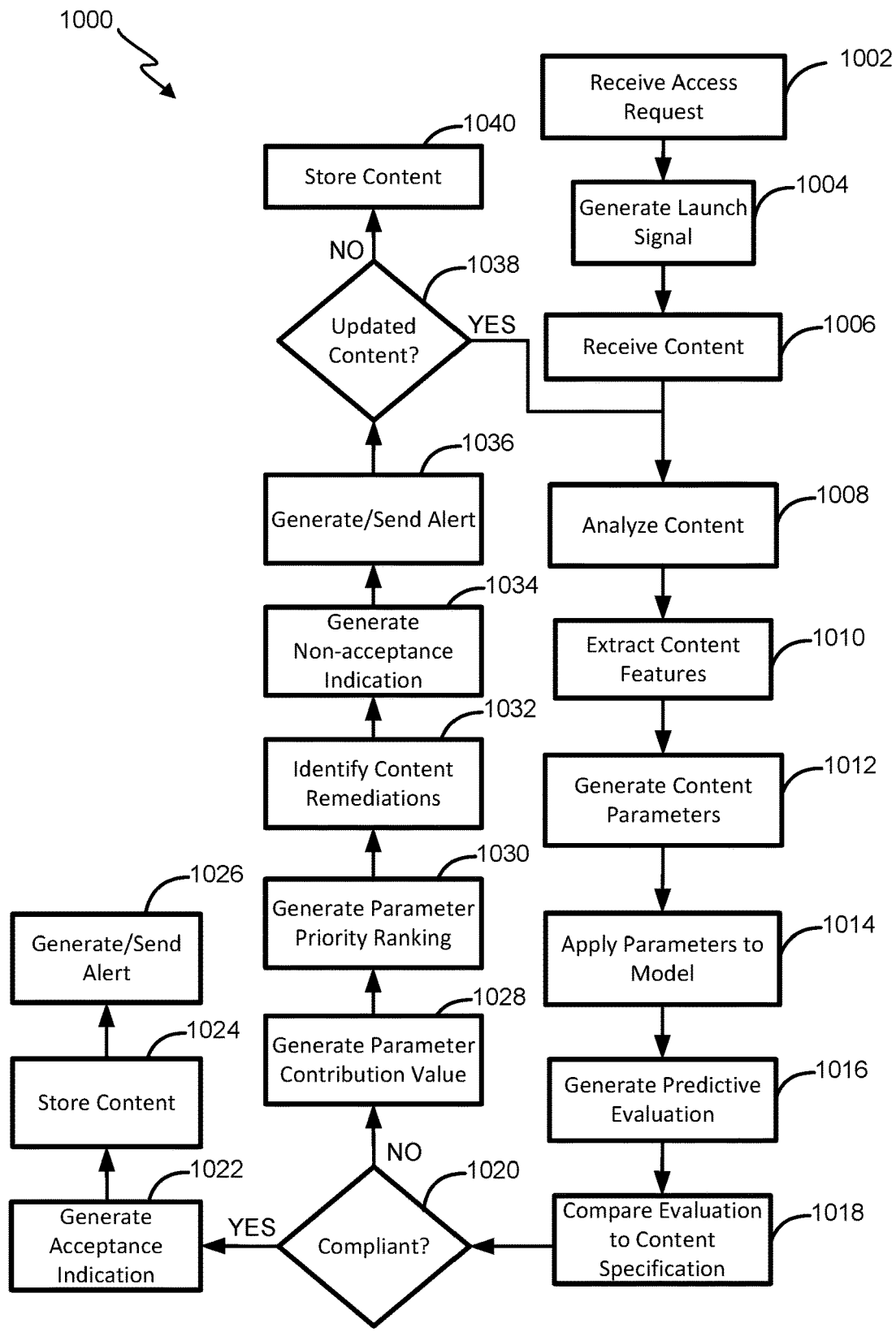
FIG. 10 is a flowchart illustrating one embodiment of a process for automatic alert generation based on data packet parameters.

With reference now to FIG. 10, a flowchart illustrating one embodiment of a process 1000 for automatic alert generation based on data packet parameters is shown. The process 1000 can be performed using some or all the components of the content distribution network 100, and can be specifically performed by the server 102.

The process 1000 begins at block 1002, wherein an access request is received. In some embodiments, the access request can be received by the server 102 from the supervisor device 110 via the communication network 120. In some embodiments, the access request can comprise a request for access to a content authoring interface and/or a request for launching of the content authoring interface. In some embodiments, the access request can correspond to the login information provided in block 902 of FIG. 9.

After the access request has been received, the process 1000 proceeds to block 1004 wherein a launch signal is generated and sent. In some embodiments, the launch signal can comprise an electrical signal that can be generated by the server 102 and sent by the server 102 to the supervisor device 110 via the communication network 120. In some embodiments, the launch signal can, upon receipt by the supervisor device 110, launch the content authoring interface in the supervisor device 110. In some embodiments, the content authoring interface can comprise one or several fields in which the user of the supervisor device 110 can author one or several data packets, upload one or several data packets, edit one or several data packets, or the like.

After the launch signal has been generated and sent, the process 1000 proceeds to block 1006 wherein a data packet is received by the server 102 from the supervisor device 110 via, for example, the communication network 120. In some embodiments, the data packet is received via one or several electrical signals. This data packet can correspond to the data packet authored in block 908 of FIG. 9. After the data packet has been received, the process 1000 proceeds to block 1008 wherein the data packet is analyzed. In some embodiments, the data packet can be analyzed by the server 102. This analysis can include, for example, automatic natural language processing, parsing, syntactic analysis, semantic analysis, or the like.

After the data packet has been analyzed, the process 1000 proceeds to block 1010 wherein one or several content features are extracted from the data packet. In some embodiments, these one or several content features can be extracted from the data packet by the server 102. After the content features have been extracted from the data packet, the process 1000 proceeds to block 1012 wherein one or several content parameters are generated from the extracted content features. In some embodiments, the generation of the content parameters can include counting one or several content features, categorizing one or several content features, evaluating one or several content features, calculating a value based on one or several content features, or the like. In some embodiments, the one or several parameters can comprise one or several linguistic parameters, including one or several linguistic parameters identified in Table 1, and/or one or several cognitive parameters including one or several cognitive parameters identified in Table 2. Thus, in some embodiments, the one or several linguistic parameters can include, for example, a value indicative of a vocabulary level of the received data packet; a value indicative of a count of prepositional phrases in the received data packet; or a value indicative of a count of noun phrases in the received data packet. In some embodiments in which a linguistic parameter comprises a count, the count can be based on the number of occurrences of features relevant to that parameter in a sentence, paragraph, response, or the like. In some embodiments, a parameter based on a count can identify the per-sentence average number of occurrences of features relevant to that parameter. In some embodiments, the server 102 can determine the vocabulary level of the received data packet, which can include: parsing the received data packet to identify words within the received data packet; selecting a word; matching the selected word to a tier of words; associating a value indicative of the tier of words with the selected words; and repeating the previous steps until all of the words in the received data packet have been associated with a value indicative of the tier of words.

After the one or several content parameters have been generated, the process 1000 proceeds to block 1014 wherein the content parameters generated in block 1012 are applied to a model, and specifically are applied to a predictive model. In some embodiments, the application of the one or several content parameters to the model can include the inputting of these parameters into one or several equations and/or algorithms embodying the model. After the parameters have been applied to the model, the process 1000 proceeds to block 1016 wherein a predictive evaluation is generated. In some embodiments, the predictive evaluation can be generated by the server 102 by the execution of the algorithm and/or the equations embodying the model. In some embodiments, the output of the predictive evaluation can comprise a value indicative of a parameter of the authored data packet, a level of the authored data packet, or the like. In some embodiments, the output of the predictive evaluation can comprise one or several values or levels indicative of the difficulty of the data packet and/or indicative of the discrimination or differentiation of the data packet.

After the predictive evaluation has been generated, the process 1000 proceeds to block 1018 wherein the predictive evaluation is compared to the content specification. In some embodiments, this can include retrieving information from the content specification and/or from the database server 104 identifying one or several thresholds indicative of the acceptability of the data packet. In some embodiments, for example, the content specification can comprise one or several thresholds demarcating between acceptable and unacceptable levels of difficulty and/or discrimination or differentiation for authored data packet. In some embodiments, for example, the content specification can comprise a first threshold setting a lower limit for difficulty and/or differentiation and a second threshold setting an upper limit for difficulty and/or differentiation for authored data packet. In some embodiments, these thresholds can be retrieved from the content library database 303 and/or the model database 309.

In some embodiments, the comparison of the predictive evaluation to the content specification can include comparing the value indicative of, for example, the difficulty and/or discrimination of the authored data packet to the threshold values of the content specification. In some embodiments, a first Boolean value can be associated with an authored data packet of an acceptable difficulty and/or discrimination level, and a second Boolean value can be associated with an authored data packet that has an unacceptable difficulty and/or discrimination level.

After the predictive evaluation has been compared to the content specification, the process 1000 proceeds to decision state 1020 wherein it is determined if the authored data packet complies with the content specification. In some embodiments, this determination can be performed by the server 102. In some embodiments, this determination can include determining whether the first Boolean value or the second Boolean value is associated with the authored data packet.

If the first Boolean value is associated with the authored data packet, and the authored content thus complies with the content specification, then the process 1000 proceeds to block 1022 wherein an acceptance indication is generated. In some embodiments, the acceptance indication can be automatically generated based on the determination of compliance in decision state 1020. The acceptance indication can indicate that the difficulty and/or discrimination or differentiation of the authored data packet complies with the content specification.

After the acceptance indication has been generated, the process 1000 proceeds to block 1024 wherein the authored data packet is stored. In some embodiments, the authored data packet can be stored in the database server 104, and can be specifically stored in the content library database 303. After the data packet has been stored, the process 1000 proceeds to block 1026 wherein an alert is generated and sent from the server 102 to the supervisor device 110 via, for example, the communication network 120. In some embodiments, the alert can comprise computer code or other features that trigger activation of the I/O subsystem 526 of the supervisor device 110, and specifically that launch the I/O subsystem 526 of the supervisor device 110 when the alert is received by the supervisor device 110. In some embodiments, this launch of the I/O subsystem 526 of the supervisor device 110 can include the providing of the acceptance indication to the user of the supervisor device 110 via, for example, the screen of the supervisor device 110, a speaker of the supervisor device 110, or the like.

Returning again to decision state 1020, if the second Boolean value is associated with the authored data packet, and thus the authored data packet does not comply with the content specification, then the process 1000 proceeds to block 1028 wherein a parameter contribution value is generated. In some embodiments, a parameter contribution value can be generated for each of the parameters of the authored data packet. This parameter contribution value can indicate the degree to which the parameter associated therewith contributed to the noncompliance of the authored data packet with the content specification. The perimeter contribution value can be stored in the database server 104, and can be specifically stored in the content library database 303.

After the parameter contribution values have been generated, the process 1000 proceeds to block 1030 wherein a parameter priority ranking is generated. In some embodiments, the parameter priority ranking can rank according to adverse impact on the compliance of the authored data packet with the content specification. Thus, the parameters can be ranked from the parameter that most adversely impacted the predictive evaluation to result in the non-compliance to the parameter that least adversely impacted the predictive evaluation to result in the non-compliance of the parameter with the content specification. The parameter priority ranking can be generated by the server 102, and the parameter priority ranking can be stored in the content library database 303.

After the parameter priority ranking has been generated, the process 1000 proceeds to block 1032 wherein one or several content remediations, also referred to herein as "data packet remediations," are identified and/or generated. In some embodiments, the data packet remediation can be generated by the server 102. In some embodiments, a data packet remediation can include a proposal for one or several changes to the authored data packet to bring the authored data packet into compliance with the content specification. In some embodiments, content remediations can be generated starting with the parameter having the highest parameter priority ranking, and thus having the largest adverse impact on the compliance of the authored data packet with the content specification. In some embodiments, data packet remediations can be generated for all of the parameters associated with the authored data packet, and in some embodiments, content remediations can be generated for a subset of the parameters associated with the authored data packet.

In some embodiments, the generation of data packet remediations can include: identifying the parameter of the set of parameters not yet associated with a data packet remediation, having the greatest adverse impact on the compliance of the authored data packet with the content specification; generating a data packet remediation for the selected parameter; and determining if the data packet remediation results in the compliance of the authored data packet with the content specification. If the data packet remediation results in the compliance of the authored data packet with the content specification, then, in some embodiments, content remediation generation can terminate. If it is determined that the data packet remediation does not result in the compliance of the authored data packet with the content specification, then the above identified steps of this paragraph can be repeated until either compliance is achieved or until there are no remaining parameters that are unassociated with a data packet remediation.

After the data packet remediation has been generated, the process 1000 proceeds to block 1034 wherein an indication of non-acceptance is generated. In some embodiments, the indication of non-acceptance can be automatically generated based on the determination of non-compliance in decision state 1020. The acceptance indication can indicate that the difficulty and/or discrimination or differentiation of the authored data packet does not comply with the content specification. In some embodiments, the indication of non-acceptance can further include the content remediations generated in block 1032.

After the indication of non-acceptance has been generated, the process 1000 proceeds to block 1036, wherein an alert is generated and sent from the server 102 to the supervisor device 110 via, for example, the communication network 120. In some embodiments, the alert can comprise computer code or other features that trigger activation of the I/O subsystem 526 of the supervisor device 110, and specifically that launch the I/O subsystem 526 of the supervisor device 110 when the alert is received by the supervisor device 110. In some embodiments, this launch of the I/O subsystem 526 of the supervisor device 110 can include the providing of the indication on non-acceptance, including the one or several change remediations to the user of the supervisor device 110 via, for example, the screen of the supervisor device 110, a speaker of the supervisor device 110, or the like.

After the alert has been generated and sent, the process 1000 proceeds to decision state 1038, wherein it is determined whether to update the authored data packet. In some embodiments, this can include determining if one or several signals have been received from the supervisor device 110, which signals accept one or several of the data packet remediations and/or otherwise change the authored content. In some embodiments, this can include determining whether the content changes of block 920 of FIG. 9 were received by the server 102.

If it is determined that the authored data packet was updated, then the process 1000 returns to block 1008, and proceeds as outlined above. If it is determined that no changes were made, the process 1000 proceeds to block 1040 wherein the authored data packet, including any received updates, is stored. In some embodiments, the authored content can be stored in the database server 104, and can be specifically stored in the content library database 303.

Figure 11:
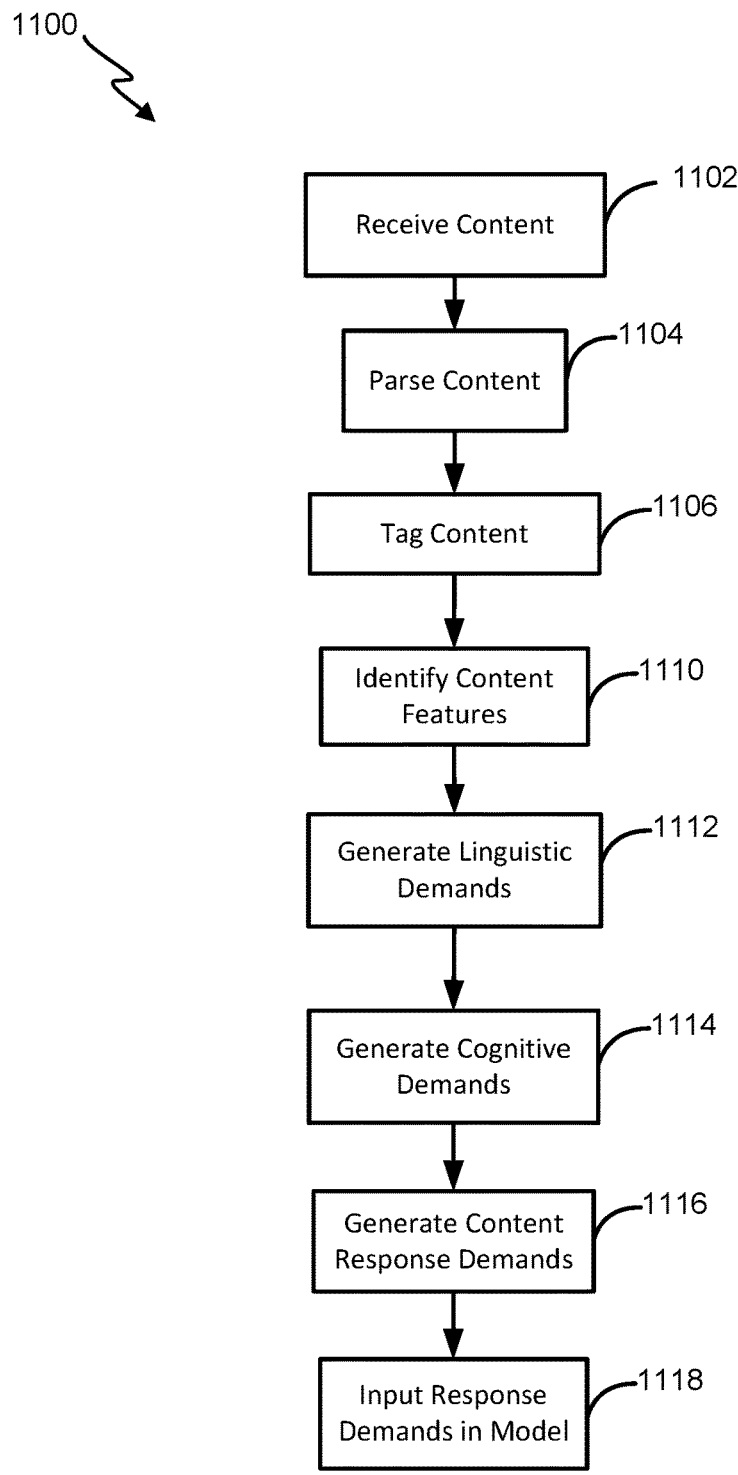
FIG. 11 is a flowchart illustrating one embodiment of a process for automatic parameter generation.

With reference now to FIG. 11, a flowchart illustrating one embodiment of a process 1100 for automatic parameter generation is shown. The process 1100 can be performed using some or all the components of the content distribution network 100, and can be specifically performed by the server 102. The process 1100 begins at block 1102, wherein the data packet is received by the server 102 from the supervisor device 110 via, for example, the communication network 120. In some embodiments, the data packet is received via one or several electrical signals. This data packet can correspond to the data packet authored in block 908 of FIG. 9.

After the data packet has been received, the process 1100 proceeds to block 1104-1108. In some embodiments, block 1104-1108 can comprise portions of the content analysis described in block 1008 of FIG. 10. At block 1104, the received data packet is parsed. In some embodiments, this parsing can include analyzing the received data packet conforming to the rules of a formal grammar, and can include, in some embodiments, the generating and/or determination of a parse tree for some or all portions of the received data packet. In some embodiments, this parsing can be performed accordingly via execution of a computerized parsing algorithm. In some embodiments, the parsing can include word segmentation, which can include, for example, the identification of words within the received data packet.

After the content has been parsed the process 1100 proceeds to block 1106, wherein some or all of the content is tagged. In some embodiments, the tagging of some or all of the data packet can include, for example, part-of-speech tagging. After the content has been tagged, the process 1100 proceeds to block 1110, wherein one or several content features, also referred to herein as "data packet features," are identified. In some embodiments, this can include comparing portions of the data packet, including, for example, one or several words, phrases, sentences, or the like to feature criteria. In some embodiments, for example, a word can be compared to one or several word lists to identify a vocabulary "Tier" for that word. In some embodiments, the identification of one or several features can include associating a unique value with a portion of the data packet when that portion of the data packet is identified as a feature. In some embodiments, this can result in a single word being associated with a plurality of unique values when that word is associated with a plurality of features.]

After the data packet features have been identified, the process 1100 proceeds to block 1112, wherein one or several linguistic demands are generated from the one or several features. In some embodiments, this can include the identification of content features relevant to a linguistic parameter, and the generation of that linguistic parameter with those relevant data packet features. In some embodiments in which the content feature comprises a count, this can include incrementing a counter for each identified feature.

After the linguistic demands have been generated, the process 1100 proceeds to block 1114, wherein the cognitive demands are generated. In some embodiments, one or several cognitive demands are generated from the one or several features. In some embodiments, this can include the identification of data packet features relevant to a cognitive parameter, and the generation of that cognitive parameter with those relevant data packet features. In some embodiments in which the data packet feature comprises a count, this can include incrementing a counter for each identified feature.

After the cognitive demands are generated, the process 1100 proceeds to block 1116, wherein the content response demands, also referred to herein as content demands, are generated. In some embodiments, one or several content demands are generated from one or several features of the response. In some embodiments, this can include the identification of data packet features relevant to a content parameter, and the generation of that content parameter with those relevant data packet features. In some embodiments in which the data packet feature comprises a count, this can include incrementing a counter for each identified feature.

After the content response demands are generated, the process 1100 proceeds to block 1118, wherein the response demands are input into the model. In some embodiments, this can correspond to block 1014 of FIG. 10.

Figure 12:
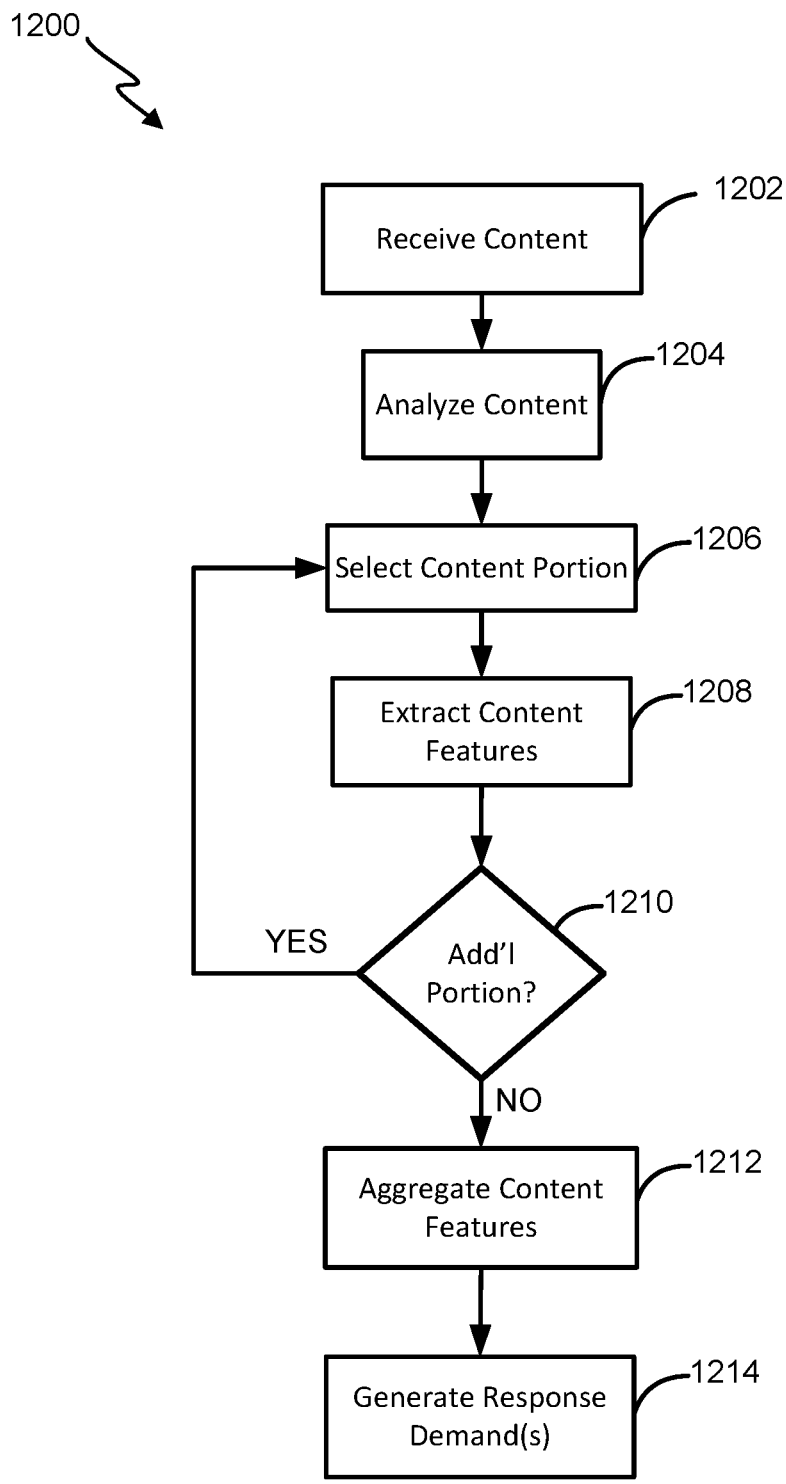
FIG. 12 is a flowchart illustrating one embodiment of a process for automatically generating a parameter from a received data packet.

With reference now to FIG. 12, a flowchart illustrating one embodiment of a process 1200 for automatically generating a parameter from received data packet is shown. The process 1200 can be performed using some or all the components of the content distribution network 100, and can be specifically performed by the server 102. The process 1200 begins at block 1202, wherein data packet is received by the server 102 from the supervisor device 110 via, for example, the communication network 120. In some embodiments, the data packet is received via one or several electrical signals. This data packet can correspond to the data packet authored in block 908 of FIG. 9.

After the content has been received, the process 1200 proceeds to block 1204, wherein the data packet is analyzed. In some embodiments, this analysis can be performed according to blocks 1104-1108 of FIG. 11, or according to block 1008 of FIG. 10. After the content has been analyzed, the process 1200 proceeds to block 1206, wherein a portion of the data packet is selected. In some embodiments, the selected portion can comprise a word, a phrase, a clause, a sentence, a paragraph, a figure, video, audio, or the like. In some embodiments, the selected data packet portion has not been previously selected at block 1206, and in some embodiments, a value indicative of selection is associated with the data packet portion when it is selected. This value can be stored in the database server 104, and specifically can be stored in the content library database 303 of the database server 104.

After the data packet portion has been selected, the process 1200 proceeds to block 1208, wherein one or several data packet features are extracted from the selected portion of the data packet. In some embodiments, this can include retrieving feature rules from the database server 104, and specifically from, for example, the content library database 303 and/or the model database 309. In some embodiments, these feature rules can be used to evaluate the selected data packet portion to determine if the data packet portion comprises one or more features. In some embodiments, a value can be associated with the data packet portion when it is identified as a feature, and multiple values can be associated with the data packet portion when it is identified as comprising a plurality of features. In some embodiments, these values can be unique, and in other embodiments, these values can be non-unique.

After the data packet features have been extracted from the selected portion of the content, the process 1200 proceeds to decisions state 1210, wherein it is determined if there is an additional data packet portion that has not been selected. In some embodiments, this can include determining if there are any data packet portions that are not associated with a value indicative of prior selection. If there are additional, unselected portions of the data packet, then the process 1200 returns to block 1206 and proceeds as outlined above.

If it is determined that there are no additional, unselected portions of the data packet, then the process 1200 proceeds to block 1212, wherein the data packet features are aggregated. In some embodiments, this aggregation of the data packet features can include the identification and/or selection of data packet features relevant to a parameter. After the content features have been aggregated, the process 1200 proceeds to block 1214, wherein one or several response demands are generated. In some embodiments, the generation of these one or several response demands can include the processing of those data packet features relevant to a parameter via one or several automated algorithms to generate that parameter. These algorithms can be retrieved from the model database 309. The generation of parameters from the data packet features can be repeated until all of the desired parameters have been generated.

Figure 13:
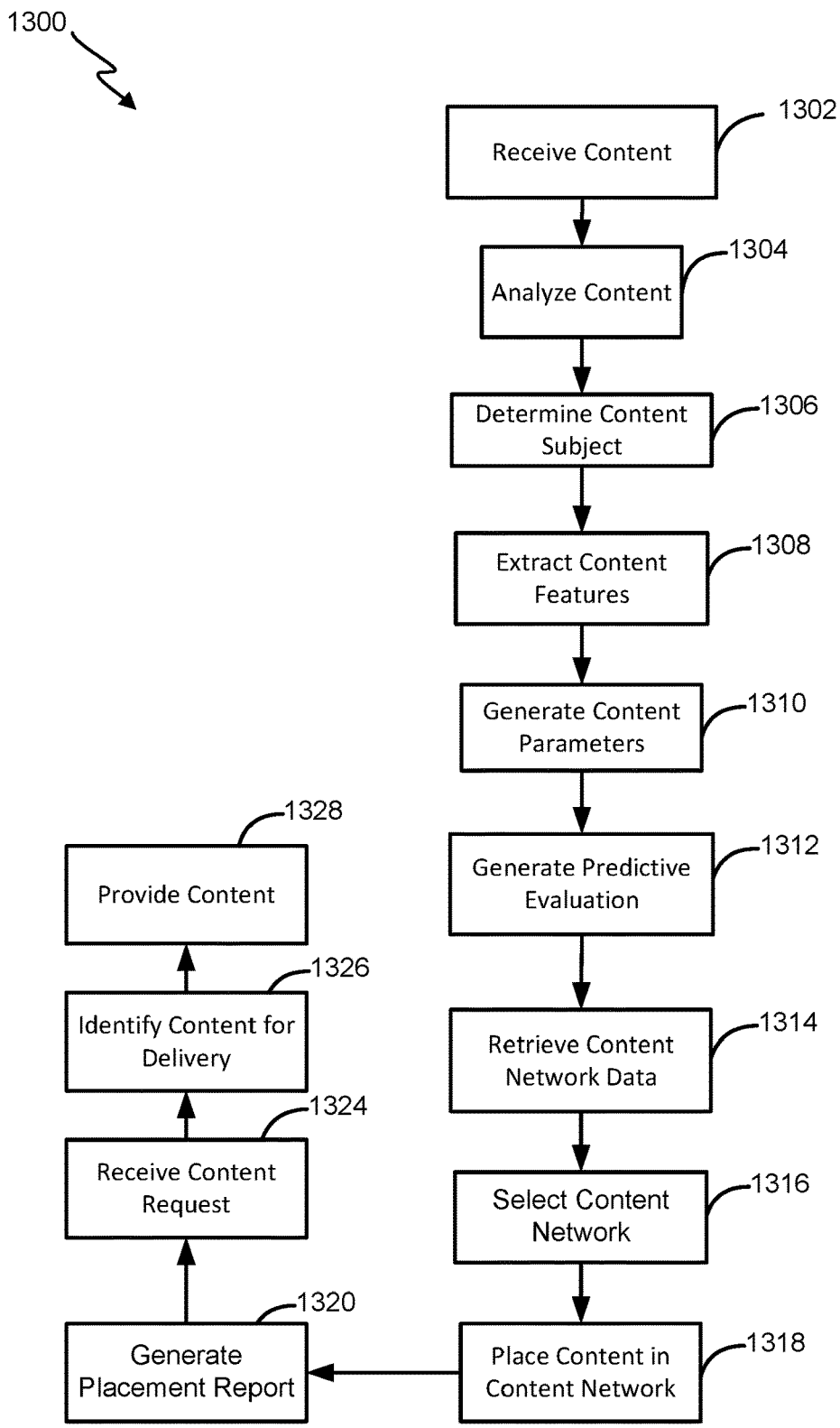
FIG. 13 is a flowchart illustrating one embodiment of a process for the automatic placement of data packet within an object network.

With reference now to FIG. 13, a flowchart illustrating one embodiment of a process 1300 for the automatic placement of data packet within an object network 350 is shown. The process 1300 can be performed by the content distribution network 100, and can specifically be performed by the server 102. The process 1300 begins at block 1302, wherein the data packet is received by the server 102. In some embodiments, the data packet can be received from the supervisor device 110, the content server 112, from the content library database 303, and/or from the external data source 311. In some embodiments, the data packet is received via one or several electrical signals.

After the data packet is received, the process 1300 proceeds to block 1304, wherein the data packet is analyzed. In some embodiments, this analysis can be performed according to blocks 1104-1108 of FIG. 11, or according to block 1008 of FIG. 10. After the data packet has been analyzed, the process 1300 proceeds to block 1306, wherein the content subject of the content is determined. In some embodiments, the content subject can be one or several attributes of the received data packet. In some embodiments, these one or several attributes can specify, for example, the relationship of the to be authored data packet to pre-existing data packet, to one or several assessments, to one or several tasks, or the like. In some embodiments, the content subject can be determined based on information received with the content specifying the content subject.

After the content subject has been determined, the process 1300 proceeds to block 1308, wherein one or several content features are extracted from the data packet. In some embodiments, these one or several content features can be extracted from the data packet by the server 102. After the content features have been extracted from the data packet, the process 1300 proceeds to block 1310 wherein one or several content parameters are generated from the extracted content features. In some embodiments, the generation of the content parameters can include counting one or several content features, categorizing one or several content features, evaluating one or several content features, calculating a value based on one or several content features, or the like.

After the content parameters are generated, the process 1300 proceeds to block 1312, wherein a predictive evaluation is generated. In some embodiments, the predictive evaluation can be generated by the server 102 by the execution of the algorithm and/or the equations embodying the model. In some embodiments, the output of the predictive evaluation can comprise a value indicative of a parameter of the data packet. In some embodiments, the output of the predictive evaluation can comprise one or several values or levels indicative of the difficulty of the data packet and/or indicative of the discrimination or differentiation of the data packet.

After the predictive evaluation has been generated, the process 1300 proceeds to block 1314, wherein content network data is retrieved. In some embodiments, the content network data can identify one or several object networks 350 stored in the content library database 303. In some embodiments, the content network data can identify the content and/or topics of each of the content object networks 350. In some embodiments, the content network data can be retrieved from the content library database 303.

After the content network data has been retrieved, the process 1300 proceeds to block 1316, wherein a content object network 350 is selected. In some embodiments, the content object network 350 can be selected such that the content network data of the selected content object network 350 corresponds to the content subject of the data packet. After the content object network 350 has been selected, the process 1300 proceeds to block 1318, wherein the data packet is placed in the content network 350. In some embodiments, the data packet can be placed in the content network 350 based on the predictive evaluation of the data packet. Specifically, the data packet can be placed in the content network 350 so as to have an intermediate difficulty between two nodes of the content network 350. In some embodiments, the placement of the data packet in the content network 350 can further include the generation of connecting vectors that connect the data packet to other nodes of the content network 350.

After the data packet is placed in the content network 350, the process 1300 proceeds to block 1320, wherein a placement report is generated. In some embodiments, the placement report can be automatically generated in response to the placement of the data packet in the content network 350. The placement report can identify the content network 350 in which the data packet was placed, and/or can identify adjacent nodes to the data packet.

After the placement report has been generated, the process 1300 proceeds to block 1324, wherein a content request is received. In some embodiments, the content request can be received by the server 102 from a user device 106. In some embodiments, the content request can be received from a user who has completed content associated with a node of the content network 350. In some embodiments, the content request can comprise a request for the content of the next node in the content network 350.

After the content request has been received, the process 1300 proceeds to block 1326, wherein the requested content is identified. In some embodiments, the requested content comprises the content received in block 1302 and placed in the content network 350 in block 138. After the content has been identified, the process 1300 proceeds to block 1328, wherein the identified content is provided. In some embodiments, the identified content can be provided to the user device 106 via the communication network 120.

Figure 14:
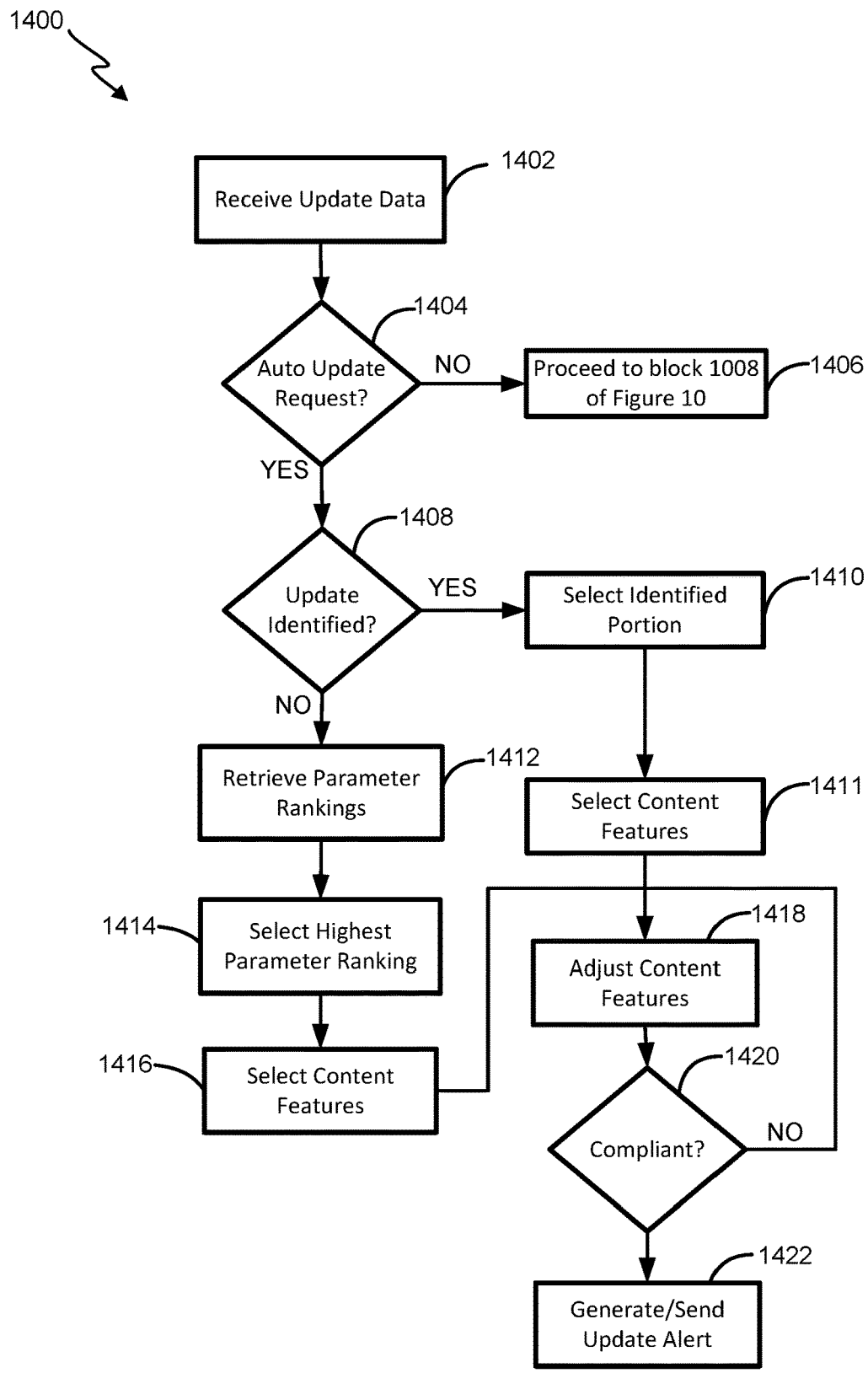
FIG. 14 is a flowchart illustrating one embodiment of a process for automatically updating a received data packet.

With reference now to FIG. 14, a flowchart illustrating one embodiment of a process 1400 for automatically updating a received data packet is shown. The process 1400 can be performed by the content distribution network 100, and can specifically be performed by the server 102. The process 1400 begins at block 1402, wherein the update data is received. In some embodiments, the update data can comprise a request to increase or decrease the difficulty of the data packet. In some embodiments, the update data can correspond to the content changes received by the supervisor device 110 and provided to the server 102 in block 918 of FIG. 9.

After the update data has been received, the process 1400 proceeds to decision state 1404, wherein it is determined if auto updating is requested. In some embodiments, this determination can be made based on one or several communications received from the supervisor device 110 and/or from information contained in a user profile of the creator of the data packet, which user profile can be contained with the user profile database 301. If it is determined that there is no auto update request, then the process 1400 proceeds to block 1406 and continues with block 1008 of FIG. 10.

If it is determined that there is an auto update request, then the process 1400 proceeds to block 1408, wherein it is determined if an update has been identified. In some embodiments, for example, the update data can identify a portion of the data packet for updating. If the update has been identified, then the process 1400 proceeds to block 1410, wherein the identified portion of the data packet is selected. After the identified portion of the data packet is selected, the process 1400 proceeds to block 1411, wherein one or several content features associated with the identified portion of the data packet are selected. In some embodiments, these selected content features can be the highest listed features on the parameter priority ranking in the identified portion of the data packet.

Returning again to decision state 1408, if it is determined that the update is not identified in the received update data, then the process 1400 proceeds to block 1412, wherein the parameter priority rankings are retrieved. In some embodiments, the parameter priority rankings are retrieved from the database server 104. After the parameter priority rankings have been retrieved, the process 1400 proceeds to block 1414, wherein one or several parameters are selected, and specifically, wherein the one or several parameters associated with the highest parameter priority ranking or rankings are selected.

After the parameters are selected, the process 1400 proceeds to block 1416, wherein one or several content features are selected. In some embodiments, these one or several content features can be the content features used in calculating the selected parameters. After the content features have been selected in either block 1411 or block 1416, the process 1400 proceeds to block 1418, wherein the content features are adjusted. In some embodiments, this can include retrieving the predictive evaluation of block 1016 of FIG. 10, determining whether the predictive evaluation indicates a difficulty and/or differentiation that is too high, or that is too low. In some embodiments, determining whether the difficulty and/or the differentiation of the data packet is too high, or too low, can allow adjustment of the content features to bring the data packet into compliance with the content specification. In some embodiments, the adjustment to the content features can be varied based on whether the difficulty and/or discrimination is too high, or too low, to thereby bring the data packet into compliance with the content specification.

After the content features have been adjusted, the process 1400 proceeds to decision state 1420, wherein it is determined if the data packet is compliant with the content specification. In some embodiments, this can include performing the steps of blocks 1012-1018 of FIG. 10. If it is determined that the data packet is not compliant, then the process 1400 returns to block 1418, and proceeds as outlined above. Alternatively, if it is determined that the data packet is not compliant, then the process 1400 proceeds to block 1416, wherein new and/or additional content features are selected, and then the process 1400 proceeds as outlined above.

Alternatively, and returning again to decision state 1420, if it is determined that the data packet is compliant with the content specification, then the process 1400 proceeds to block 1422, wherein an update alert is generated and/or sent. In some embodiments, the update alert can be generated by the server 102 and can be sent to the supervisor device 110 used by the user to author the data packet. In some embodiments, this update alert can identify the changes made to the data packet. In some embodiments, the alert can comprise computer code or other features that trigger activation of the I/O subsystem 526 of the supervisor device 110, and specifically that launch the I/O subsystem 526 of the supervisor device 110 when the alert is received by the supervisor device 110. In some embodiments, this launch of the I/O subsystem 526 of the supervisor device 110 can include the providing of the updates to the data packet to the user of the supervisor device 110 via, for example, the screen of the supervisor device 110, a speaker of the supervisor device 110, or the like. In some embodiments, the sending of the update alert can result in the launch of the I/O subsystem 526 of the supervisor device 110.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for remote intervention comprising:
   memory comprising:
      a user profile database comprising information identifying one or several attributes of a user;
      a content database comprising data identifying predetermined content levels and data identifying some of the predetermined content levels as acceptable; and
      a model database comprising data identifying a plurality of response demands and data identifying algorithms for determining the plurality of response demands;
   a supervisor device comprising:
      a network interface configured to exchange data via the communication network; and
      an I/O subsystem configured to convert electrical signals to user-interpretable outputs via a user interface;
   a content management server, wherein the content management server is configured to:
      receive a first electrical signal from the supervisor device, wherein the first electrical signal comprises a request for access to a content authoring interface;
      generate and send an electrical signal to the supervisor device directing the launch of the content authoring interface;
      receive a second electrical signal from the supervisor device, wherein the second electrical signal comprises content received by the content authoring interface;
      identify a plurality of response demands in the received content;
      determine a level of the received content based on the identified plurality of response demands;
      determine the acceptability of the received content based on the identified plurality of response demands; and
      generate and send an alert to the supervisor device, wherein the alert comprises computer code to trigger activation of the I/O subsystem of the supervisor device to provide an indication of the acceptability of the received content and a change recommendation for the received content.

2. The system of claim 1, wherein the response demands comprise a plurality of linguistic response demands and a plurality of cognitive response demands.

3. The system of claim 2, wherein the plurality of linguistic response demands comprise at least one of: a value indicative of a vocabulary level of the received content; or a value indicative of a syntactic demand.

4. The system of claim 3, wherein the content management server is configured to determine the vocabulary level of the received content.

5. The system of claim 4, wherein determining the vocabulary level of the received content comprises:
   (i) parsing the received content to identify words within the received content;
   (ii) selecting a word;
   (iii) matching the selected word to a tier of words;
   (iv) associating a value indicative of the tier of words with the selected words; and
   (v) repeating steps (ii)-(iv) until all of the words in the received content have been associated with a value indicative of the tier of words.

6. The system of claim 5, wherein determining the acceptability of the received content based on the identified plurality of response demands comprises:
   retrieving data identifying some of the predetermined content levels as acceptable from the content database; and
   comparing the determined level of the received content to the data identifying some of the predetermined content levels as acceptable.

7. The system of claim 6, wherein determining the acceptability of the received content based on the identified plurality of response demands further comprises associating a first value with the received content when the comparison of the determined level of the received content and the data identifying some of the predetermined content levels as acceptable indicates that the determined level of the received content is acceptable.

8. The system of claim 6, wherein determining the acceptability of the received content based on the identified plurality of response demands further comprises associating a second value with the received content when the comparison of the determined level of the received content and the data identifying some of the predetermined content levels as acceptable indicates that the determined level of the received content is unacceptable.

9. The system of claim 8, wherein the indication of the acceptability of the received content comprises data identifying the determined level of the received content as unacceptable.

10. The system of claim 9, wherein the change recommendation identifies a portion of the received content for change and comprises a recommended change for that portion of the received content.

11. A method for remote intervention comprising:
   receiving a first electrical signal at a content management server from a supervisor device comprising a network interface and an I/O subsystem, wherein the I/O subsystem is configured to convert electrical signals to user-interpretable outputs via a user interface, and wherein the first electrical signal comprises a request for access to a content authoring interface;
   generating and sending an electrical signal from the content management server to the supervisor device directing the launch of the content authoring interface by the I/O subsystem;
   receiving a second electrical signal at the content management server from the supervisor device, wherein the second electrical signal comprises content received by the content authoring interface;
   identifying with the content management server a plurality of response demands in the received content;
   determining with the content management server a level of the received content based on the identified plurality of response demands;
   determining with the content management server the acceptability of the received content based on the identified plurality of response demands; and
   generating and sending an alert from the content management server to the supervisor device, wherein the alert triggers activation of the I/O subsystem of the supervisor device to provide an indication of the acceptability of the received content and a change recommendation for the received content.

12. The method of claim 11, wherein the response demands comprise a plurality of linguistic response demands and a plurality of cognitive response demands.

13. The method of claim 12, wherein the plurality of linguistic response demands comprise at least one of: a value indicative of a vocabulary level of the received content; or a value indicative of a syntactic demand.

14. The method of claim 13, further comprising determining the vocabulary level of the received content.

15. The method of claim 14, wherein determining the vocabulary level of the received content comprises:
   (vi) parsing the received content to identify words within the received content;
   (vii) selecting a word;
   (viii) matching the selected word to a tier of words;
   (ix) associating a value indicative of the tier of words with the selected words; and
   (x) repeating steps (ii)-(iv) until all of the words in the received content have been associated with a value indicative of the tier of words.

16. The method of claim 15, wherein determining the acceptability of the received content based on the identified plurality of response demands comprises:
   retrieving data identifying some of the predetermined content levels as acceptable from the content database; and
   comparing the determined level of the received content to the data identifying some of the predetermined content levels as acceptable.

17. The method of claim 16, wherein determining the acceptability of the received content based on the identified plurality of response demands further comprises associating a first value with the received content when the comparison of the determined level of the received content and the data identifying some of the predetermined content levels as acceptable indicates that the determined level of the received content is acceptable.

18. The method of claim 16, wherein determining the acceptability of the received content based on the identified plurality of response demands further comprises associating a second value with the received content when the comparison of the determined level of the received content and the data identifying some of the predetermined content levels as acceptable indicates that the determined level of the received content is unacceptable.

19. The method of claim 18, wherein the indication of the acceptability of the received content comprises data identifying the determined level of the received content as unacceptable.

20. The method of claim 19, wherein the change recommendation identifies a portion of the received content for change and comprises a recommended change for that portion of the received content.

\* \* \* \* \*